(12) United States Patent
Ikeda et al.

(10) Patent No.: US 10,516,825 B2
(45) Date of Patent: Dec. 24, 2019

(54) IMAGE PROCESSING DEVICE, IMAGE PROCESSING METHOD, AND COMPUTER PROGRAM PRODUCT FOR CORRECTING A MOTION VECTOR OF A LOW-RELIABILITY BLOCK

(71) Applicant: OLYMPUS CORPORATION, Hachioji-shi, Tokyo (JP)

(72) Inventors: Hideru Ikeda, Tokyo (JP); Akira Ueno, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/813,529

(22) Filed: Nov. 15, 2017

(65) Prior Publication Data

US 2018/0077354 A1  Mar. 15, 2018

Related U.S. Application Data

(63) Continuation of application No. PCT/JP2016/061703, filed on Apr. 11, 2016.

(30) Foreign Application Priority Data

May 21, 2015 (JP) .................. 2015-103890

(51) Int. Cl.
| | |
|---|---|
| *H04N 5/232* | (2006.01) |
| *H04N 5/14* | (2006.01) |
| *H04N 5/217* | (2011.01) |

(52) U.S. Cl.
CPC ......... *H04N 5/23267* (2013.01); *H04N 5/144* (2013.01); *H04N 5/217* (2013.01); *H04N 5/23254* (2013.01)

(58) Field of Classification Search
CPC .... H04N 5/23267; H04N 5/217; H04N 5/144; H04N 5/23254; G06T 7/20
See application file for complete search history.

(56) References Cited

U.S. PATENT DOCUMENTS

2008/0239097 A1* 10/2008 Izuhara .................. H04N 5/772
348/231.99
2009/0208102 A1* 8/2009 Watanabe ................. G06T 7/30
382/168

(Continued)

FOREIGN PATENT DOCUMENTS

| EP | 2 317 763 A1 | 5/2011 |
| JP | 9-73540 A | 3/1997 |

(Continued)

OTHER PUBLICATIONS

International Search Report dated May 10, 2016, issued in Counterpart of International Application No. PCT/JP2016/061703 (4 pages) w/English Translation.

*Primary Examiner* — Gevell V Selby
(74) *Attorney, Agent, or Firm* — Westerman, Hattori, Daniels & Adrian, LLP

(57) ABSTRACT

Motion vector calculator sets motion vector of block corresponding to partial area of first image based on the block and similarity between the block and partial area of second image, motion vector reliability calculator calculates reliability of the motion vector based on distribution of the similarities, motion vector corrector corrects motion vector of low-reliability block having reliability lower than predetermined reliability based on motion vector of high-reliability block different from the low-reliability block and having reliability equal to or higher than the predetermined reliability, and image processor sets second pixel of the second image and corresponds to first pixel of the first image based on the motion vector corrected by the motion vector cor- (Continued)

rector, and performs image processing using signal value of the first pixel and signal value of the second pixel.

6 Claims, 16 Drawing Sheets

(56) References Cited

U.S. PATENT DOCUMENTS

| | | | |
|---|---|---|---|
| 2009/0310876 A1* | 12/2009 | Nishi | H04N 5/145 |
| | | | 382/236 |
| 2010/0157072 A1* | 6/2010 | Luo | H04N 5/23248 |
| | | | 348/208.4 |
| 2012/0014565 A1 | 1/2012 | Akiyama et al. | |

FOREIGN PATENT DOCUMENTS

| | | |
|---|---|---|
| JP | 2007-306199 A | 11/2007 |
| JP | 2012-22655 A | 2/2012 |
| JP | 2014-39169 A | 2/2014 |
| WO | 2010/023982 A1 | 3/2010 |

* cited by examiner

FIG. 5

| RELIABILITY 0 a0 | RELIABILITY 0 b0 | RELIABILITY 0 c0 | RELIABILITY 0 d0 | RELIABILITY 0 e0 |
|---|---|---|---|---|
| RELIABILITY 0 a1 | RELIABILITY 1 b1 | RELIABILITY 2 c1 | RELIABILITY 0 d1 | RELIABILITY 0 e1 |
| RELIABILITY 0 a2 | RELIABILITY 0 b2 | RELIABILITY 7 c2 | RELIABILITY 0 d2 | RELIABILITY 0 e2 |
| RELIABILITY 0 a3 | RELIABILITY 5 b3 | RELIABILITY 0 c3 | RELIABILITY 0 d3 | RELIABILITY 7 e3 |
| RELIABILITY 7 a4 | RELIABILITY 0 b4 | RELIABILITY 1 c4 | RELIABILITY 0 d4 | RELIABILITY 0 e4 |

FIG. 6
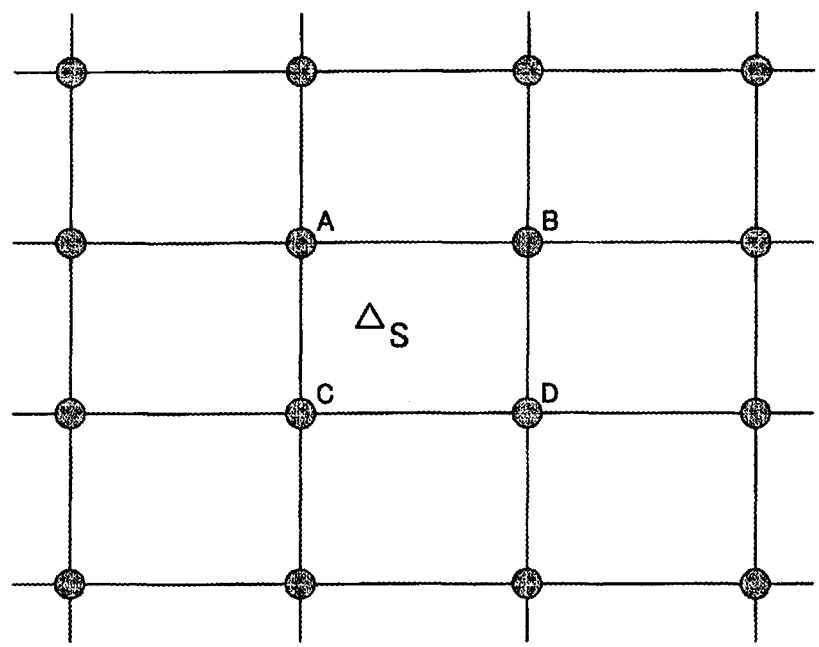
FIG. 7
(a) 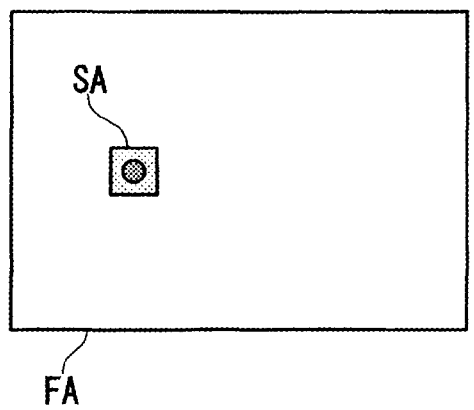
(b) 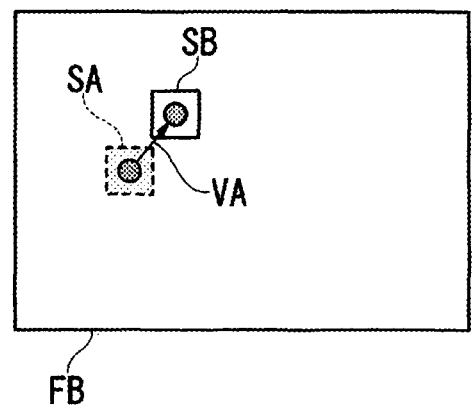

IMAGE PROCESSING DEVICE, IMAGE PROCESSING METHOD, AND COMPUTER PROGRAM PRODUCT FOR CORRECTING A MOTION VECTOR OF A LOW-RELIABILITY BLOCK

CROSS REFERENCE TO RELATED APPLICATIONS

This application is a continuation application based on a PCT Patent Application No. PCT/JP2016/061703, filed on Apr. 11, 2016, whose priority is claimed on Japanese Patent Application No. 2015-103890, filed May 21, 2015, the entire contents of which are hereby incorporated by reference.

BACKGROUND OF THE INVENTION

Field of the Invention

The present invention relates to an image processing device, an image processing method and a program.

Description of the Related Art

Imaging apparatuses such as digital cameras generally have various functions such as noise reduction (NR). When imaging apparatuses have more sophisticated functions, image processing for providing such functions becomes more complicated. For example, in an imaging apparatus 90 illustrated in FIG. 18, a motion calculator 93 calculates a motion vector for each of regions obtained by dividing a luminance image (Y image) into predetermined sizes based on Y images of two temporally adjacent frames acquired by an imager 91. An image processor 97 performs image quality enhancement processing of position alignment (hereinafter referred to as image quality enhancement processing) using motion vectors calculated by the motion calculator 93 for a color-separated image acquired by the imager 91. Such processing includes inter-frame NR processing, for example.

The motion calculator 93 performs matching between Y images of two temporally adjacent frames to search for regions corresponding to each other and calculates a position difference between the corresponding regions as a motion vector. A correct motion vector may not be calculated all the time due to differences between images which are processing targets. In addition, calculation of a motion vector generally requires complicated operations. Accordingly, calculation of respective motion vectors for all pixels in a frame requires a longer processing time or a larger circuit scale.

Accordingly, an image processing device disclosed in Japanese Unexamined Patent Application, First Publication No. 2014-39169 estimates a motion amount between images, executes a motion compensation process for aligning one image with the position of the other image to generate a motion compensated image, and generates an image which has been subjected to noise reduction and the like according to a process of composing the motion compensated image and the position-aligned image.

A motion compensated image generation unit generates a motion compensated image using a selected image which has been selected according to a predefined image selection criterion. For example, a motion estimation suitability determination unit which determines whether an input image is an eligible image suitable for motion estimation is provided, and only when the input image is an eligible image, the input image is stored in a frame memory as a reference image to be applied to motion estimation.

SUMMARY

According to an aspect of the present invention in order to achieve the aforementioned objects, an image processing device includes: a motion vector calculator which sets a motion vector of a block corresponding to a partial area of a first image based on the block and a similarity between the block and a partial area of a second image; a motion vector reliability calculator which calculates a reliability of the motion vector based on a distribution of the similarities; a frame motion vector calculator which calculates a frame motion vector which is a motion vector of the entire first image based on a motion vector of a high-reliability block having a reliability equal to or higher than a predetermined reliability, and a reliability of the frame motion vector based on a distribution of the motion vectors of the high-reliability blocks; a motion vector corrector which determines whether to correct a motion vector of a low-reliability block having a reliability lower than the predetermined reliability using the frame motion vector based on the reliability of the frame motion vector and corrects the motion vector of the low-reliability block based on the frame motion vector when determining that the motion vector of the low-reliability block is to be corrected; and an image processor which sets a second pixel that is a pixel of the second image and corresponds to a first pixel which is a pixel of the first image based on the motion vector corrected by the motion vector corrector, and performs image processing using a signal value of the first pixel and a signal value of the second pixel.

According to another aspect of the present invention, an image processing device includes: a motion vector calculator which sets a motion vector of a block corresponding to a partial area of a first image based on the block and a similarity between the block and a partial area of a second image; a motion vector reliability calculator which calculates a reliability of the motion vector based on a distribution of the similarities; a frame motion vector calculator which calculates a frame motion vector which is a motion vector of the entire first image based on a motion vector of a high-reliability block different from a low-reliability block having a reliability lower than a predetermined reliability and having a reliability equal to or higher than the predetermined reliability, and a reliability of the frame motion vector based on a distribution of the motion vectors of the high-reliability blocks; a motion vector corrector which determines whether to correct motion vectors of all blocks of the first image using the frame motion vector based on the reliability of the frame motion vector; and an image processor which sets a second pixel that is a pixel of the second image and corresponds to a first pixel which is a pixel of the first image based on the motion vector corrected by the motion vector corrector, and performs image processing using a signal value of the first pixel and a signal value of the second pixel.

According to another aspect of the present invention, the image processing device further includes a distortion-corrected coordinates calculator which corrects a set of coordinates of each pixel representing the first image based on distortion correcting data representing a relationship between a set of coordinates of each pixel forming a captured image and a set of coordinates after distortion correction.

According to another aspect of the present invention, an image processing method of an image processing device includes: a motion vector calculation step of setting a motion vector of a block corresponding to a partial area of a first image based on the block and a similarity between the block and a partial area of a second image; a motion vector reliability calculation step of calculating a reliability of the motion vector based on a distribution of the similarities; a frame motion vector calculation step of calculating a frame motion vector which is a motion vector of the entire first image based on a motion vector of a high-reliability block having a reliability equal to or higher than a predetermined reliability, and a reliability of the frame motion vector based on a distribution of the motion vectors of the high-reliability blocks; a motion vector correction step of determining whether to correct a motion vector of a low-reliability block having a reliability lower than the predetermined reliability using the frame motion vector based on the reliability of the frame motion vector and correcting the motion vector of the low-reliability block based on the frame motion vector when determining the motion vector of the low-reliability block to be corrected; and an image processing step of setting a second pixel that is a pixel of the second image and corresponds to a first pixel which is a pixel of the first image based on the motion vector corrected by the motion vector corrector, and performing image processing using a signal value of the first pixel and a signal value of the second pixel.

According to another aspect of the present invention, an image processing method of an image processing device includes: a motion vector calculation step of setting a motion vector of a block corresponding to a partial area of a first image based on the block and a similarity between the block and a partial area of a second image; a motion vector reliability calculation step of calculating a reliability of the motion vector based on a distribution of the similarities; a frame motion vector calculation step of calculating a frame motion vector which is a motion vector of the entire first image based on a motion vector of a high-reliability block different from a low-reliability block having a reliability lower than a predetermined reliability and having a reliability equal to or higher than the predetermined reliability, and a reliability of the frame motion vector based on a distribution of the motion vectors of the high-reliability blocks; a motion vector correction step of determining whether to correct motion vectors of all blocks of the first image using the frame motion vector based on the reliability of the frame motion vector; and an image processing step of setting a second pixel that is a pixel of the second image and corresponds to a first pixel which is a pixel of the first image based on the motion vector corrected by the motion vector corrector, and performing image processing using a signal value of the first pixel and a signal value of the second pixel.

According to another aspect of the present invention, a computer program product comprising computer readable instructions, which when loaded and run in a computer processor, is provided for causing the computer processor of an image processing device to execute; a motion vector calculation procedure for setting a motion vector of a block corresponding to a partial area of a first image based on the block and a similarity between the block and a partial area of a second image; a motion vector reliability calculation procedure for calculating a reliability of the motion vector based on a distribution of the similarities; a frame motion vector calculation procedure for calculating a frame motion vector which is a motion vector of the entire first image based on a motion vector of a high-reliability block having a reliability equal to or higher than a predetermined reliability, and a reliability of the frame motion vector based on a distribution of the motion vectors of the high-reliability blocks; a motion vector correction procedure for determining whether to correct a motion vector of a low-reliability block having a reliability lower than the predetermined reliability using the frame motion vector based on the reliability of the frame motion vector and correcting the motion vector of the low-reliability block based on the frame motion vector when determining the motion vector of the low-reliability block to be corrected; and an image processing procedure for setting a second pixel that is a pixel of the second image and corresponds to a first pixel which is a pixel of the first image based on the motion vector corrected by the motion vector correction procedure, and performing image processing using a signal value of the first pixel and a signal value of the second pixel.

According to another aspect of the present invention, a computer program product comprising computer readable instructions, which when loaded and run in a computer processor, is provided for causing the computer processor of an image processing device to execute; a motion vector calculation procedure for setting a motion vector of a block corresponding to a partial area of a first image based on the block and a similarity between the block and a partial area of a second image; a motion vector reliability calculation procedure for calculating a reliability of the motion vector based on a distribution of the similarities; a frame motion vector calculation procedure for calculating a frame motion vector which is a motion vector of the entire first image based on a motion vector of a high-reliability block different from a low-reliability block having a reliability lower than a predetermined reliability and having a reliability equal to or higher than the predetermined reliability, and a reliability of the frame motion vector based on a distribution of the motion vectors of the high-reliability blocks; a motion vector correction procedure for determining whether to correct motion vectors of all blocks of the first image using the frame motion vector based on the reliability of the frame motion vector; and an image processing procedure for setting a second pixel that is a pixel of the second image and corresponds to a first pixel which is a pixel of the first image based on the motion vector corrected by the motion vector correction procedure, and performing image processing using a signal value of the first pixel and a signal value of the second pixel.

BRIEF DESCRIPTION OF THE DRAWINGS

FIG. 5 is a diagram illustrating an example of a reliability calculated for each block.

FIG. 6 is a diagram describing a method of calculating a motion vector for each pixel.

FIG. 7 is a diagram describing position alignment.

DETAILED DESCRIPTION OF THE PREFERRED EMBODIMENTS

First Embodiment

Hereinafter, a first embodiment of the present invention will be described with reference to the drawings.

Figure 1:
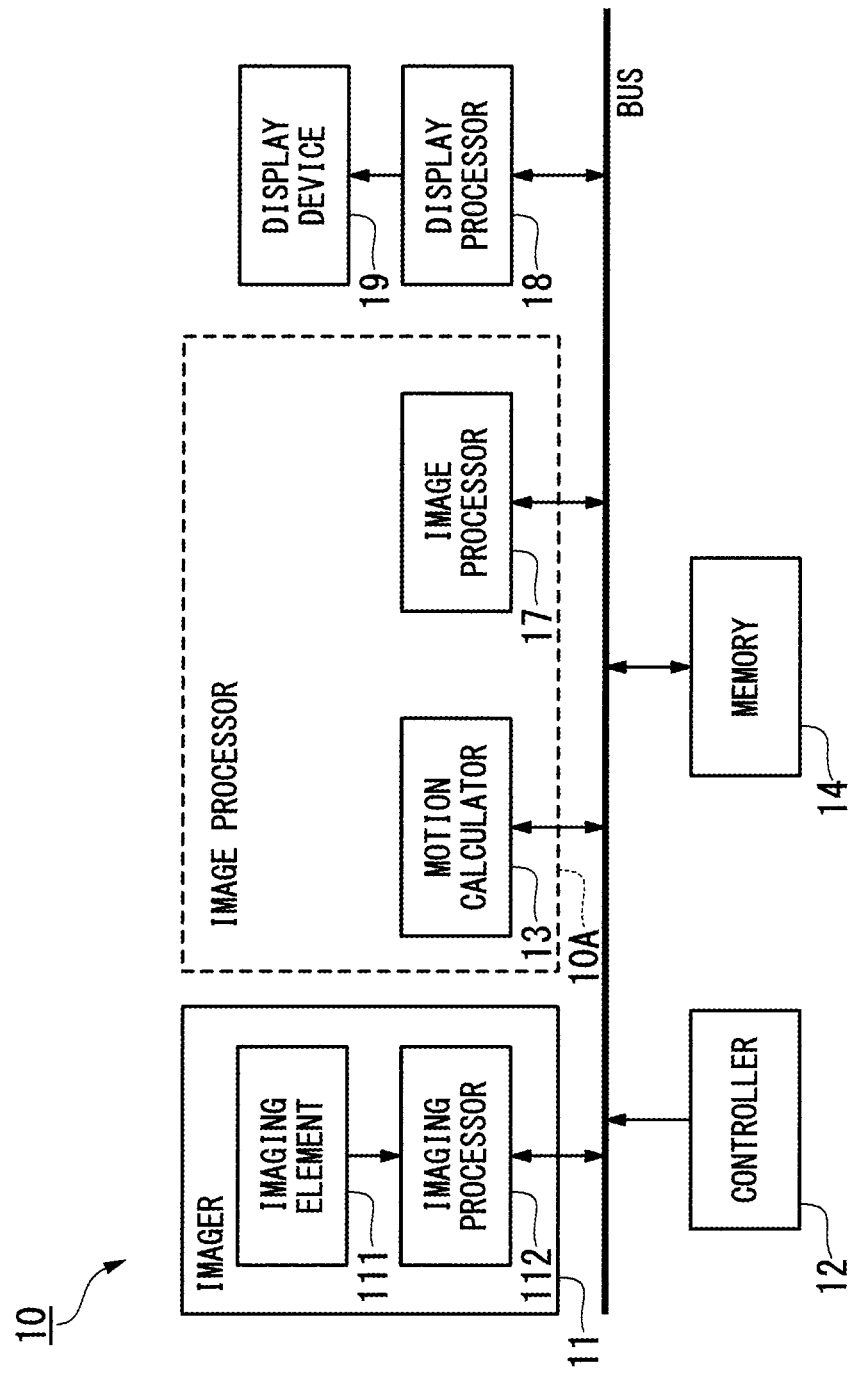
FIG. 1 is a schematic block diagram illustrating a configuration of an imaging apparatus according to a first embodiment.

FIG. 1 is a schematic block diagram illustrating a configuration of an imaging apparatus 10 according to the present embodiment.

The imaging apparatus 10 includes an image processor 10A, an imager 11, a display processor 18, and a display device 19. The imager 11 includes an imaging element 111 and an imaging processor 112. The imaging apparatus 10 has a function of capturing moving images.

For example, the imaging apparatus 10 is a digital camera. The imaging processor 112, a controller 12, a memory 14, a motion calculator 13 of the image processor 10A, an image processor 17, and the display processor 18 are connected through a bus (base line) such that various types of data can be input/output to/from them. The configuration of the image processor 10A will be described below.

The imager 11 captures an image of a subject within a field of view and acquires a luminance image and a chrominance image by representing the captured image with luminance.

The imaging element 111 captures an optical image of the subject, which is formed on an imaging plane, using a lens (not shown). In the imaging element 111, a plurality of light-receiving elements (pixels) are arranged on the two-dimensional imaging plane and a color filter having a Bayer arrangement is attached thereto. Each light-receiving element converts arriving light into a pixel signal that is an electrical signal according to photoelectric conversion and outputs the converted pixel signal to the imaging processor 112. For example, the imaging element 111 is a charge coupled device (CCD) image sensor, a complementary metal-oxide semiconductor (CMOS) image sensor or the like.

The imaging processor 112 performs various imaging processes on pixel signals input from the imaging element 111 to generate imaging processing data which represents a Bayer image of each frame captured per predetermined time (e.g., 1/30 seconds). The imaging processes include analog-to-digital (A/D) conversion, pixel defect correction, optical black/white balance (OB/WB) processes and the like. The imaging processor 112 performs a color-separating process on the imaging processing data to generate luminance image data (Y image data) representing a luminance image and chrominance image data (C image data) representing a chrominance image. The chrominance image data includes Cb image data representing a Cb (chrominance: blue) image and Cr image data representing a Cr (chrominance: red) image. The imaging processor 112 stores Y image data and C image data generated for each frame in a memory 14. In the following description, Y image data and C image data acquired through the color-separating process are collectively called color-separated image data.

The controller 12 controls the operation of each component included in the imaging apparatus 10. For example, the controller 12 performs setting of an operation mode of each component, setting of parameters used for processing, timing of processing executed between components, control of the order of such processing, and the like.

The memory 14 is a storage unit which stores various types of data used for processing executed by each component included in the imaging apparatus 10 and data generated by such processing. For example, the memory 14 includes a storage medium such as a dynamic random access memory (DRAM).

The display processor 18 reads image processing data for each frame acquired through the image processor 17 of the image processor 10A and performs various display processes on the read image processing data to output display image data representing an image for display (display image) to the display device 19.

For example, the display processes include a resizing process for changing the size of the image represented by the image processing data to an image having a size which can be displayed through the display device 19, a process for overlapping on-screen display (OSD) data for OSD display, and the like.

The display device 19 displays the display image based on the display image data input from the display processor 18. For example, the display device 19 is a liquid crystal display (LCD), an organic electro-luminescence (EL) display or the like. The display device 19 may be an electronic view finder (EVF).

(Configuration of Image Processor)

Next, a configuration of the image processor 10A according to the present embodiment will be described.

Figure 2:
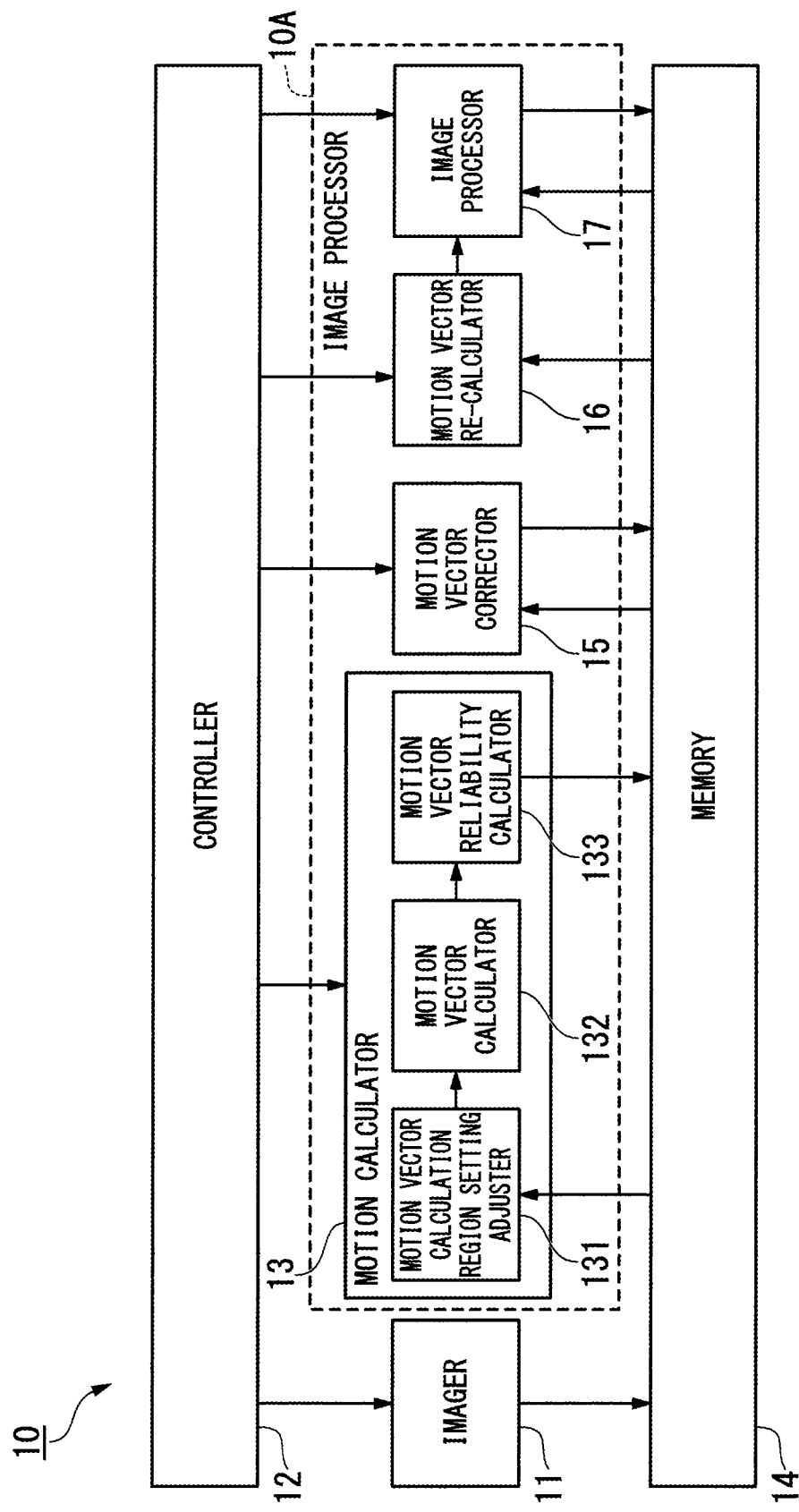
FIG. 2 is a schematic block diagram illustrating a configuration of an image processor according to the first embodiment.

FIG. 2 is a schematic block diagram illustrating the configuration of the image processor 10A according to the present embodiment.

The image processor 10A includes the motion calculator 13, a motion vector corrector 15, a motion vector re-calculator 16, and the image processor 17. The motion calculator 13 includes a motion vector calculation region setting adjustor 131, a motion vector calculator 132, and a motion vector reliability calculator 133.

The motion vector calculation region setting adjustor 131 reads block data representing a signal value of each pixel within the relevant block from the memory 14 for each block that is a partial area of a Y image represented by Y image data of a frame (current frame) at that point. In the following description, the current frame may be called a frame A.

The motion vector calculation region setting adjustor 131 reads block data representing a signal value of each pixel within the relevant block from the memory 14 for each block that is a partial area of a Y image represented by Y image data of a past frame (previous frame) temporally adjacent to the current frame. In the following description, the previous frame may be called a frame B. Each block is a region that is a target of calculation of a motion vector between frames A and B to be described below. The same number of blocks are set to the frames A and B, positions of a plurality of blocks set to the respective frames are different, and the plurality of blocks do not overlap. The motion vector calculation region setting adjustor 131 outputs block data of each of the frames A and B to the motion vector calculator 132. An example of setting blocks to the frames A and B will be described below.

The block data of each of the frames A and B is input to the motion vector calculator 132 from the motion vector calculation region setting adjustor 131. The motion vector calculator 132 performs block matching between each block indicated by the block data of the frame A and a block (corresponding block) which corresponds to the block and is indicated by the block data of the frame B. As described below, the block size of the frame A is smaller than the block size of the frame B and a corresponding block is used as a search area of a motion vector. In block matching, the motion vector calculator 132 calculates an index value of a similarity for each region (matching block) that is at a different position within a corresponding block and has the same size as the block size of the frame A, for each block (reference block) of the frame A.

For example, an index value such as the sum of absolute differences (SAD), the sum of squared differences (SSD) or the like can be used. The SAD and the SSD are index values which indicate higher similarity when they are smaller.

The motion vector calculator 132 selects a matching block provided with an index value indicating highest similarity among calculated index values of similarity for each reference block. The motion vector calculator 132 sets a difference between a set of coordinates of a predetermined reference point (e.g., a left upper pixel, a center point, or the like) of the selected matching block and a set of coordinates of a reference point of the relevant reference block as a motion vector. The motion vector calculator 132 outputs a motion vector calculated for each reference block and motion data indicating an index value of a similarity of each matching block position to the motion vector reliability calculator 133. An example of calculation of a motion vector will be described below.

For the index value of the similarity of each reference block represented by the motion data input from the motion vector calculator 132, the motion vector reliability calculator 133 calculates an index value indicating a reliability of a motion vector related to the relevant reference block based on a distribution of reference points within the corresponding block of the matching block. For example, the motion vector reliability calculator 133 calculates a difference between the average value and the minimum value of the SAD in each distribution as an index value indicating a reliability. This index value is higher when the distribution is narrower and converges to a specific value and lower when the distribution is wider and dispersed. That is, motion vector reliability indicates a degree to which an index value of similarity is stably acquired depending on differences of the position of a matching block. In addition, the standard deviation or variance of the SAD, or the like can be used as an index value indicating a reliability. Furthermore, the SSD may be used instead of the SAD. Further, for an index value indicating a reliability, the motion vector reliability calculator 133 determines a level to which the index value belongs among a plurality of predetermined levels. The motion vector reliability calculator 133 stores reliability data indicating a level determined for each reference block and the motion data input from the motion vector calculator 132 in the memory 14. An example of reliability will be described below.

The motion vector corrector 15 reads reliability data and motion data from the memory 14. The motion vector corrector 15 determines whether a reliability indicated by reliability data is lower than a predetermined reliability threshold value for each reference block. For a block (low-reliability block) determined to have a low reliability, the motion vector corrector 15 calculates a correction value based on a motion vector of a block (surrounding block) that is located within a predetermined range from the low-reliability block and has a reliability equal to or higher than the threshold value. For example, the motion vector corrector 15 calculates the average value of motion vectors of surrounding blocks having a reliability corresponding to a predetermined highest level as a correction value. The motion vector corrector 15 sets the calculated correction value as a motion vector of the low-reliability block. The motion vector corrector 15 updates the motion vector of the low-reliability block indicated by the read motion data to the set motion vector and stores motion data indicating the updated motion vector in the memory 14. An example of calculation of the correction value will be described below.

The motion vector re-calculator 16 reads motion data from the memory 14 and interpolates a motion vector of each reference block indicated by the read motion data to calculate a motion vector of each pixel. More specifically, the motion vector re-calculator 16 employs the motion vector of the relevant reference block as a motion vector of a pixel belonging to each of the reference blocks. The motion vector re-calculator 16 sets a vector acquired by interpolating a motion vector of a reference block within a predetermined range from a pixel which does not belong to each reference block as a motion vector of the pixel. The motion vector re-calculator 16 outputs a motion vector per pixel which indicates a motion vector set for each pixel to the image processor 17. An example of calculation of a motion vector per pixel will be described below.

The image processor 17 reads color-separated image data of the frames A and B from the memory 14. The image processor 17 adds the motion vector of each pixel indicated by the motion data per pixel input from the motion vector re-calculator 16 to a set of coordinates of the relevant pixel of the frame A to calculate a set of coordinates (a set of corresponding coordinates) corresponding to the relevant pixel of the frame B. The process of calculating the set of corresponding coordinates may be called position alignment or motion compensation. The image processor 17 performs predetermined image processing based on the signal value of each pixel indicated by the color-separated image data of the frame A and a signal value of a pixel at the set of corresponding coordinates indicated by the color-separated image data of the frame B. For example, the image processor 17 performs position alignment image quality enhancement processing such as inter-frame NR processing as the predetermined image processing. The image processor 17 generates image processing data indicating a signal value of each pixel acquired through the predetermined image processing and stores the generated image processing data in the memory 14.

(Example of Setting Block)

Next, an example of setting blocks to the frames A and B will be described.

Figure 3:
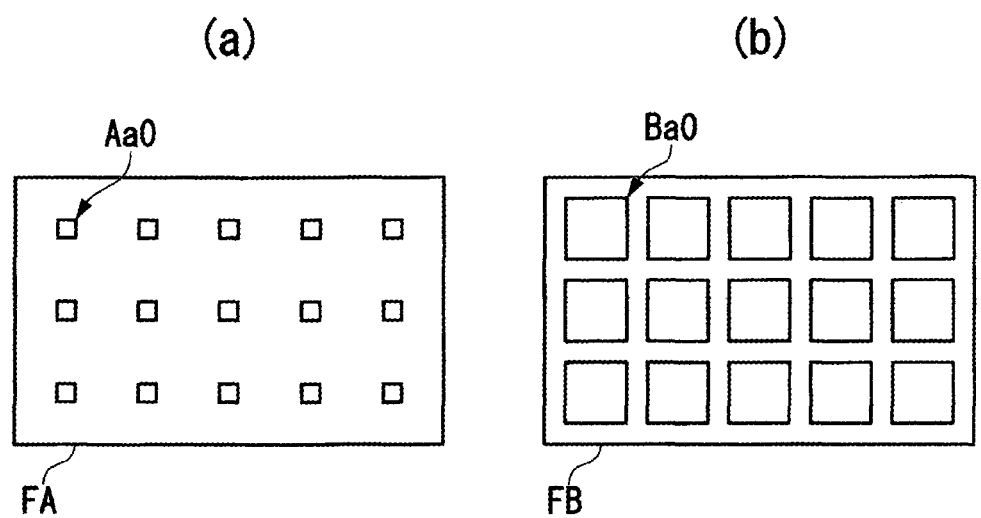
FIG. 3 is a diagram illustrating a block setting example according to the first embodiment.

FIG. 3 is a diagram illustrating an example of setting blocks according to the present embodiment.

In FIG. 3, FA and FB represent the frames A and B, respectively. In each of the frames A and B, fifteen (five in the horizontal direction and three in the vertical direction) squares arranged at equal intervals represent blocks. The set of coordinates of the center of each block set to the frame A is the same as the set of coordinates of the center of each corresponding block set to the frame B. For example, the set of coordinates of the center of a left upper end block Aa0 of the frame A is the same as the set of coordinates of the center of a left upper end block Ba0 of the frame B.

The block size of the frame A is smaller than the block size of the block B. For example, the block size of the frame A corresponds to eight pixels in the horizontal direction and eight pixels in the vertical direction, whereas the block size of the frame B corresponds to thirty-two pixels in the horizontal direction and thirty-two pixels in the vertical direction. Accordingly, the region of each block of the block A is included in the region of each corresponding block of the block B. As described above, each block of the block A uses each corresponding block of the frame B as a motion vector search area.

If the block size of the frame A is smaller than the block size of the frame B, the block size of the frame A is not limited to the aforementioned one. For example, the block size of the frame A may correspond to four pixels in the horizontal direction and four pixels in the vertical direction. The block size of the frame B may correspond to sixty-four pixels in the horizontal direction and sixth-four pixels in the vertical direction. In addition, although the frame B has an area in which blocks are not set in the example illustrated in FIG. 3, the entire area of the frame B may be covered by a plurality of blocks and thus the frame B may not have an area in which blocks are not set.

(Example of Calculating Motion Vector)

Next, an example of calculating a motion vector will be described.

Figure 4:
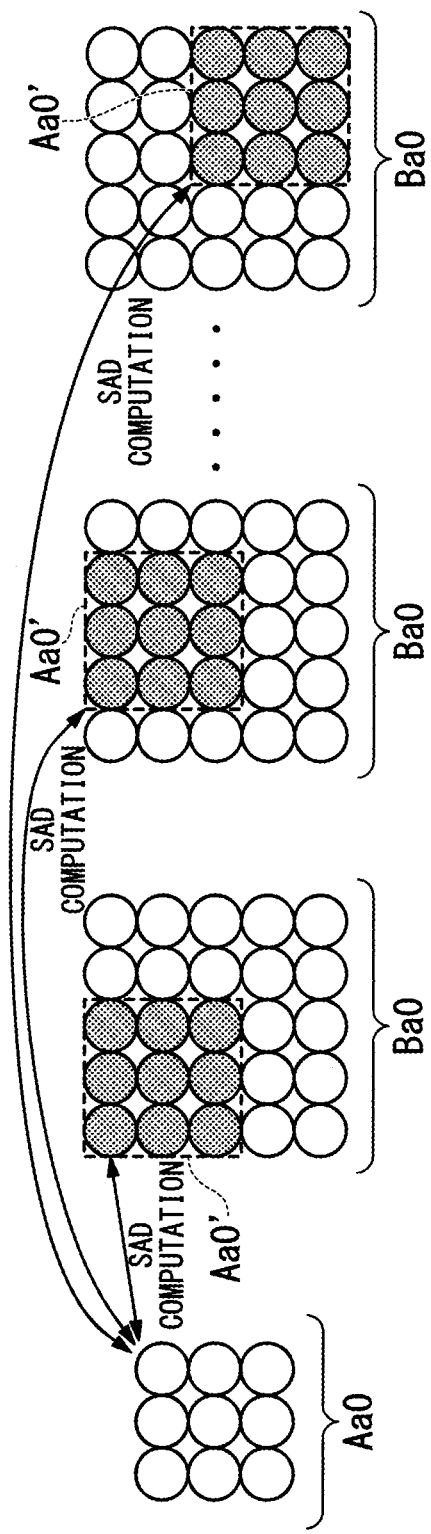
FIG. 4 is a diagram describing a method of calculating a motion vector.

FIG. 4 is a diagram describing a method of calculating a motion vector. The motion vector calculator 132 performs block matching between each block of the frame A and each corresponding block of the frame B using each block of the frame A as a reference block to calculate one motion vector. FIG. 4 illustrates block matching between a block Aa0 (three pixels in the horizontal direction and three pixels in the vertical direction) of the frame A and a block Ba0 (five pixels in the horizontal direction and five pixels in the vertical direction) of the frame B.

In the example illustrated in FIG. 4, the motion vector calculator 132 calculates the SAD between the block Aa0 and a matching block Aa' having different pixel positions. The matching block Aa0' is a region having the same size as the block Aa0 in the block Ba0 and there are nine (=(5−3+1)×(5−3+1)) matching blocks Aa0' in the block Bat. FIG. 4 respectively illustrates a case in which a matching block Aa0' is located at the left upper end, a case in which the matching block Aa0' is located in the second row in the horizontal direction from the left upper end and a case in which the matching block Aa0' is located at the right lower end in the second line, third line and fourth line from the left of FIG. 4. In addition, the motion vector calculator 132 selects a matching block Aa0' providing a minimum SAD from the nine matching blocks Aa0'. The motion vector calculator 132 calculates a difference between a set of coordinates of a reference point of the selected matching block Aa0' and a set of coordinates of a reference point of the block Aa0 as a motion vector.

(Example of Reliability)

Next, an example of reliability will be described. FIG. 5 is a diagram illustrating an example of reliability calculated for each block. The example illustrated in FIG. 5 shows a reliability of each of twenty-five blocks a0 to e4 (five blocks in the horizontal direction and five blocks in the vertical direction) within the frame A. Reliability is represented in the second row of a square indicating each block. Such reliability is represented as a level obtained by normalizing a difference between the average value and the minimum value of the SAD to any one of eight levels of 0 to 7 for each block. A larger numerical value indicating a level represents a lower reliability. For example, 0 among 0 to 7 indicates the highest reliability and 7 indicates the lowest reliability. A reliability of a block c2 corresponding to the third column and the third row from the left upper end of FIG. 5 is 7. A reliability of a block b2 corresponding to the third column and the second row from the left upper end of FIG. 5 is 0. The reliability levels are not limited to having eight levels and there may be seven levels or less and nine levels or more as long as there are two levels or more.

(Example of Calculating Correction Value)

Next, an example of calculating a correction value will be described. For a low-reliability block having a reliability equal to or lower than a predetermined threshold value (e.g., 0), the motion vector corrector 15 calculates a correction value based on motion vectors of surrounding blocks arranged within a predetermined range from the low-reliability block and have a reliability equal to or higher than the threshold value. In the example illustrated in FIG. 5, the motion vector corrector 15 determines the block c2 having the reliability of 7 as a low-reliability block. The motion vector corrector 15 sets blocks b2, c3, d1 and d2, each of that is a region in one block adjacent to the block c2 in the horizontal direction and the vertical direction and has a reliability equal to or higher than a predetermined threshold value, as surrounding blocks. Then, the motion vector corrector 15 calculates the average value of motion vectors of the blocks b2, c3, d1 and d2 as a correction value. The threshold value of reliability may be a value indicating a reliability lower than 0, for example, 1. The size of a region which can have surrounding blocks may be larger than three blocks in the horizontal direction and three blocks in the vertical direction, for example, five blocks in the horizontal direction and five blocks in the vertical direction.

The motion vector corrector 15 reads reliability data and motion data from the memory 14. The motion vector corrector 15 determines whether a reliability indicated by the reliability data is lower than a predetermined reliability threshold value for each reference block. For a block (low-reliability block) determined to have a lower reliability, the motion vector corrector 15 calculates a correction value based on motion vectors of blocks (surrounding blocks) arranged within a predetermined range from the low-reliability block and have a reliability equal to or higher than the threshold value. For example, the motion vector corrector 15 calculates the average value of motion vectors of surrounding blocks having a reliability corresponding to a predetermined highest level among the surrounding blocks as a correction value. Further, when it is determined that there is no surrounding block, the motion vector corrector 15 sets a correction value to 0. The motion vector corrector 15 sets the calculated correction value as a motion vector of the low-reliability block. The motion vector corrector 15 updates the motion vector of the low-reliability block that is indicated by the read motion data to the set motion vector and stores motion data indicating the updated motion vector in the memory 14. An example of calculating a correction value will be described below.

(Example of Calculating Motion Vector of Each Pixel)

Next, an example of calculating a motion vector of each pixel will be described.

FIG. 6 is a diagram describing a method of calculating a motion vector of each pixel. In FIG. 6, symbol ● distributed in a grid indicates a pixel as a representative point in each block of the frame A. For example, the representative point may be positioned at the center point of a block or at the left upper end of a block. For such pixels, the motion vector re-calculator 16 sets motion vectors of blocks to which the pixels belong as motion vectors of the pixels. In the example illustrated in FIG. 6, a pixel arranged corresponding to coordinate values of the center point of each block is shown and illustration of pixels in other blocks is omitted. Mark Δ represents a pixel S as an example of a pixel other than the representative point of each block of the frame A. For such pixels, the motion vector re-calculator 16 sets a vector obtained by interpolating motion vectors of four blocks adjacent to the pixel S in the horizontal direction and the vertical direction (adjacent 4-point interpolation) as a motion vector (Qx, Qy) of the pixel S, for example. The four blocks adjacent to the pixel S in the horizontal direction and the vertical direction are blocks having center points A, B, C and D. These center points have horizontal coordinate values (x-coordinate values) and vertical coordinate values (y-coordinate values) which are respectively closest to the x-coordinate value and the y-coordinate value of the pixel S in the positive direction or negative direction among the center points of respective blocks in the frame.

According to adjacent 4-point interpolation, the motion vector (Qx, Qy) of the pixel S is calculated using Equation (1).

$$Qx = k0 \cdot Ax' + k1 \cdot Cx' + k2 \cdot Bx' + k3 \cdot Dx',$$

$$Qy = k0 \cdot Ay' + k1 \cdot Cy' + k2 \cdot By' + k3 \cdot Dy',$$

$$k0 = (1-qx) \cdot (1-qy), k1 = qx \cdot (1-qy),$$

$$k2 = (1-qx) \cdot qy, k3 = qx \cdot qy \qquad (1)$$

In Equation (1), Qx, Ax', Cx', Bx' and Dx' represent horizontal coordinate values (x-coordinate values) of the motion vector with respect to the pixel S, center point A, center point C, center point B and center point D, respectively. Qy, Ay', Cy', By' and Dy' represent vertical coordinate values (y-coordinate values) of the motion vector with respect to the pixel S, center point A, center point C, center point B and center point D, respectively.

qx and qy represent x-coordinate and y-coordinate values of the pixel S using the center point A as a reference point in a case in which the distance between the center points of blocks is normalized to 1.

Further, for a pixel which does not have four blocks adjacent thereto in the horizontal direction and the vertical direction, the motion vector re-calculator 16 sets a vector acquired by interpolating motion vectors of two adjacent blocks as a motion vector of the pixel. For example, for a pixel having an x-coordinate value smaller than that of the block at the left end in the frame A and a pixel having an x-coordinate value larger than that of the block at the right end in the frame A, a vector acquired by interpolating motion vectors of two adjacent blocks in the vertical direction is set as a motion vector of each of the pixels. For a pixel having a y-coordinate value smaller than that of the block at the upper end in the frame A and a pixel having a y-coordinate value larger than that of the block at the lower end in the frame A, a vector acquired by interpolating motion vectors of two adjacent blocks in the horizontal direction is set as a motion vector of each of the pixels. In addition, for a pixel which does not have a plurality of adjacent blocks, the motion vector re-calculator 16 sets a motion vector of one block closest to the pixel as a motion vector of the pixel. Accordingly, "interpolation" is not necessarily limited to "insertion" and includes "extrapolation" and "replacement."

The sum of a set of coordinates of a pixel of the frame A and the motion vector of the pixel corresponds to the set of corresponding coordinates of the frame B. The motion vector re-calculator 16 sets a motion vector having a set of corresponding coordinates out of the range of the frame B to 0. Accordingly, there is no pixel disposed at the set of corresponding coordinates, and thus the case in which the image processor 17 cannot process pixels disposed at sets of corresponding coordinates between frames is avoided.

(Example of Position Alignment)

Next, an example of position alignment will be described. FIG. 7 is a diagram describing position alignment. SA represents a target pixel that is a processing target of the frame A FA. The image processor 17 adds a motion vector VA of the target pixel SA to the set of coordinates of the target pixel SA to calculate a set of corresponding coordinates of the frame B and specifies a corresponding pixel SB disposed at the calculated set of corresponding coordinates. The corresponding pixel SB is a pixel disposed at the position corresponding to the target pixel SA which constitutes an image represented as the frame A. In addition, the image processor 17 performs predetermined image processing, for example, NR processing using a signal value of the target pixel SA and a signal value of the corresponding pixel SB.

(Image Processing)

Next, image processing according to the present embodiment will be described.

Figure 8:
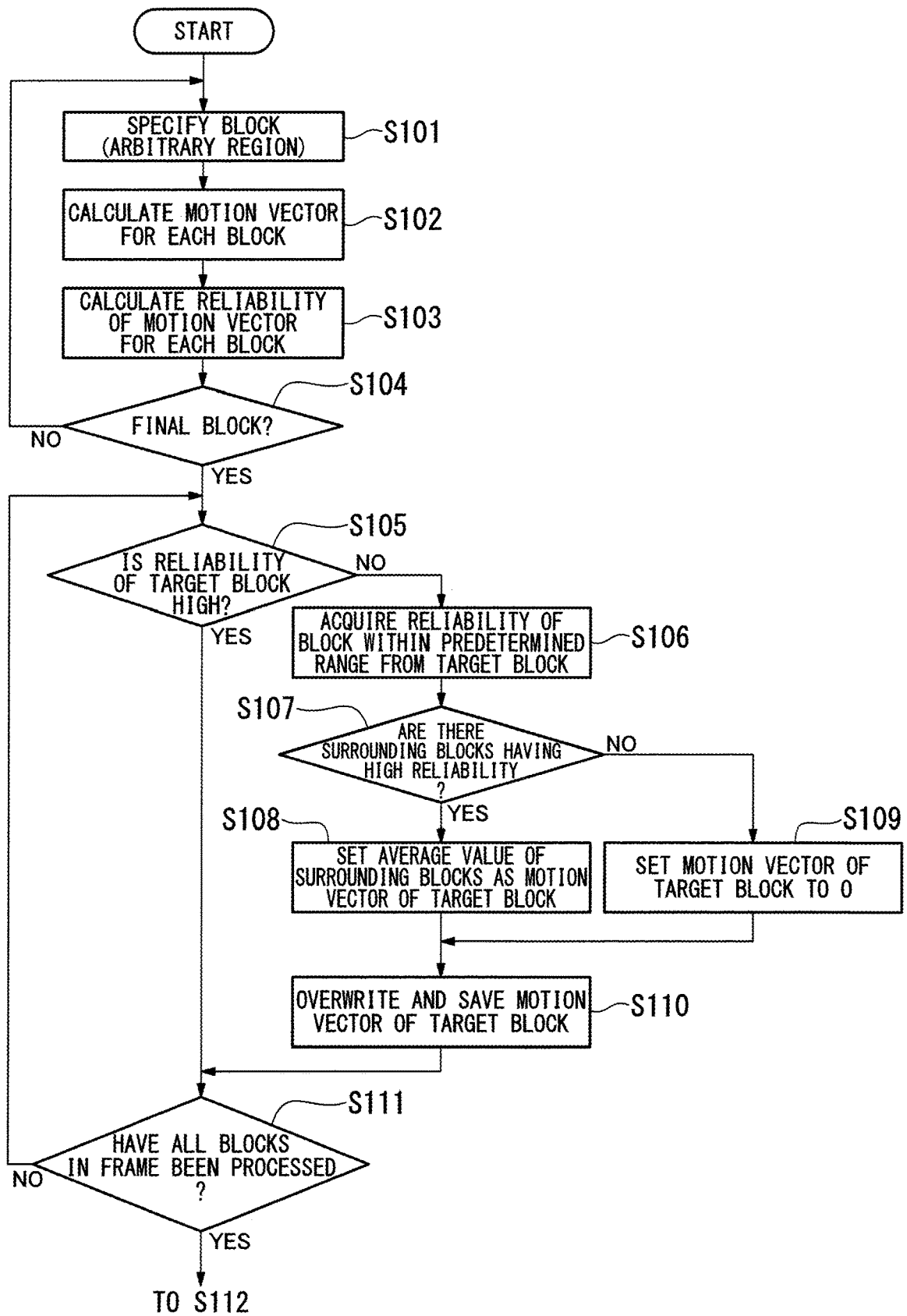
FIG. 8 is a part of a flowchart illustrating image processing according to the first embodiment.
Figure 9:
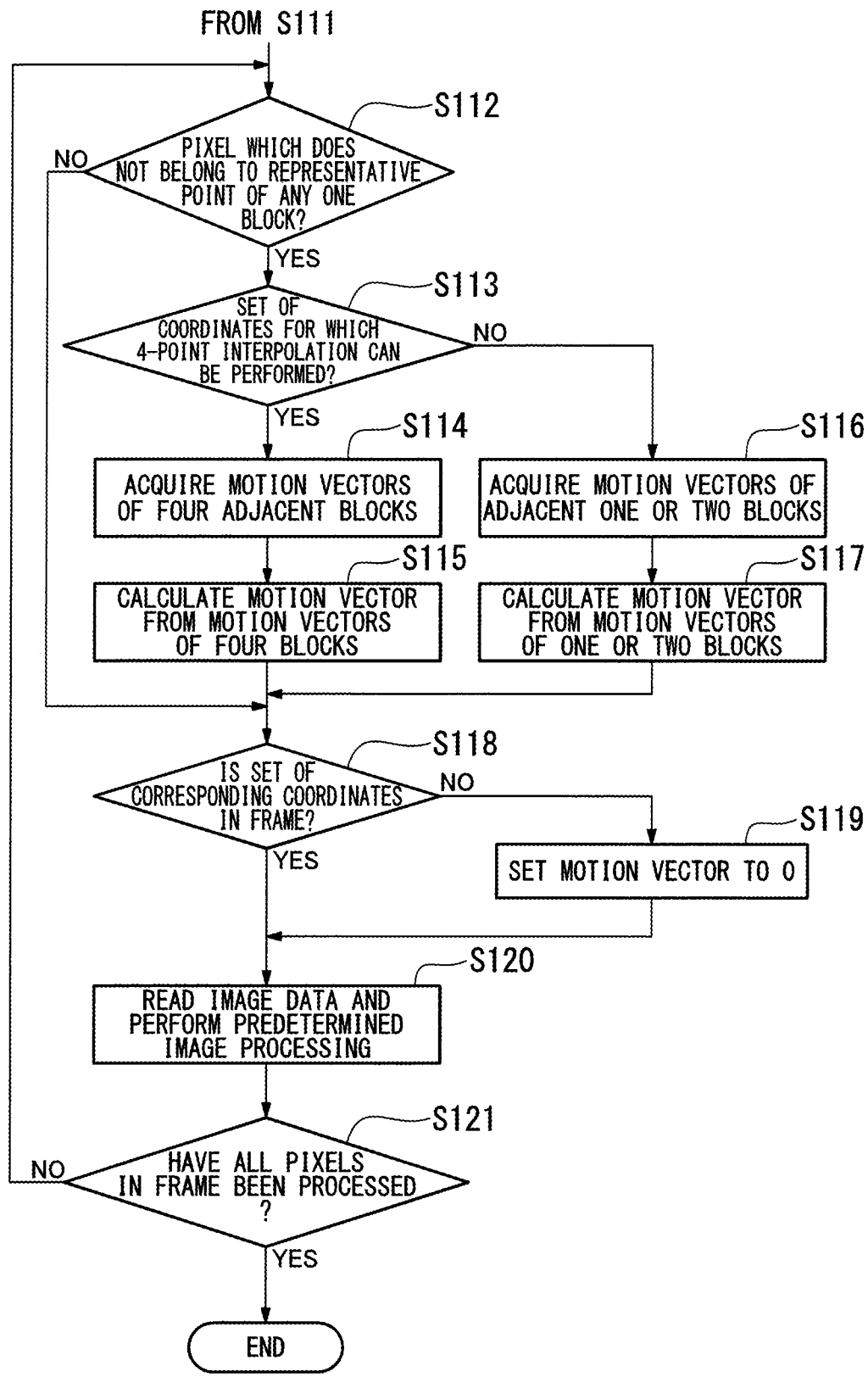
FIG. 9 is another part of the flowchart illustrating image processing according to the first embodiment.

FIGS. 8 and 9 are flowcharts illustrating image processing according to the present embodiment. The image processing has steps S101 to S121. FIGS. 8 and 9 show steps S101 to S111 and steps 112 to S121, respectively.

(Step S101) The motion vector calculation region setting adjustor 131 specifies a target block for a processing target region and a corresponding block thereof for each of the frames A and B. Then, the processing proceeds to step S102.

(Step S102) The motion vector calculator 132 performs block matching between the target block of the frame A and the corresponding block of the frame B to calculate a motion vector. Then, the processing proceeds to step S103.

(Step S103) The motion vector reliability calculator 133 calculates a reliability of the motion vector with respect to the target block of the frame A based on a distribution of similarities calculated in block matching. Then, the processing proceeds to step S104.

(Step S104) The controller 12 determines whether the target block of the frame A is a final block. When it is determined that the target block is the final block (YES in step S104), the processing proceeds to step S105. When it is determined that the target block is not the final block (NO in step S104), the controller 12 changes the target block that is the processing target to the next block based on a predetermined processing order (e.g., raster scan order). Then, the processing returns to step S101.

(Step S105) For the target block of the frame A, the motion vector corrector 15 determines whether a reliability is lower than a predetermined reliability threshold value and whether there is a reliability equal to or higher than the threshold value. When it is determined that the reliability is higher than the threshold value (YES in step S105), the processing proceeds to step S111. When it is determined that the reliability is lower than the threshold value (NO in step S105), the processing proceeds to step S106.

(Step S106) The motion vector corrector 15 acquires reliabilities of surrounding blocks arranged within a predetermined range from the target block. Then, the processing proceeds to step S107.

(Step S107) The motion vector corrector 15 determines whether there is a surrounding block having a reliability equal to or higher than a predetermined threshold value for the acquired surrounding blocks. When it is determined that there is a surrounding block having a reliability equal to or higher than the predetermined threshold value (YES in step S107), the processing proceeds to step S108. When it is determined that there is no surrounding block having a reliability equal to or higher than the predetermined threshold value (NO in step S107), the processing proceeds to step S109.

(Step S108) The motion vector corrector 15 sets the average value of motion vectors of the surrounding blocks as a motion vector of the target block. Then, the processing proceeds to step S110.

(Step S109) The motion vector corrector 15 sets the motion vector of the target block to 0. Then, the processing proceeds to step S110.

(Step S110) The motion vector corrector 15 overwrites and saves motion vector data representing the set motion vector of the target block in the memory 14. Then, the processing proceeds to step S111.

(Step S111) The controller 12 determines whether the target block of the frame A is the final block. When it is determined that the target block is the final block (YES in step S111), the processing proceeds to step S112. When it is determined that the target block is not the final block (NO in step S111), the controller 12 changes the target block that is the processing target to the next block based on a predetermined processing order. Then, the processing proceeds to step S105.

(Step S112) The motion vector re-calculator 16 determines whether the target block that is the processing target is a pixel which does not belong to the representative point of any block in the frame A. When it is determined that the target block is a pixel which does not belong to the representative point of any block (YES in step S112), the processing proceeds to step S113. When it is determined that the target block is a pixel corresponding to the representative point of any block (NO in step S112), the motion vector re-calculator 16 sets the motion vector of the block to which a set of target coordinates belongs as a motion vector of the target pixel and proceeds to step S118.

(Step S113) The motion vector re-calculator 16 determines whether the target pixel is disposed at a set of coordinates for which 4-point interpolation can be performed. When it is determined that the target pixel is disposed at a set of coordinates for which 4-point interpolation can be performed (YES in step S113), the processing proceeds to step S114. When it is determined that the target pixel is not disposed at a set of coordinates for which 4-point interpolation can be performed (NO in step S113), the processing proceeds to step S116.

(Step S114) The motion vector re-calculator 16 acquires motion vectors of four blocks adjacent to the target pixel. Then, the processing proceeds to step S115.

(Step S115) The motion vector re-calculator 16 sets a vector obtained by 4-point-interpolating the acquired motion vectors of the four blocks as a motion vector of the target pixel. Then, the processing proceeds to step S118.

(Step S116) The motion vector re-calculator 16 acquires the motion vector of one block closest to the target pixel or motion vectors of two adjacent blocks. Then, the processing proceeds to step S117.

(Step S117) The motion vector re-calculator 16 sets a vector obtained through calculation based on the acquired one or two motion vectors as a motion vector of the target pixel. Then, the processing proceeds to step S118.

(Step S118) The motion vector re-calculator 16 adds the set of coordinates of the target pixel to the set motion vector to calculate a set of corresponding coordinates of the frame B. The motion vector re-calculator 16 determines whether the calculated set of corresponding coordinates is within the range of the frame B. When it is determined that the calculated set of corresponding coordinates is within the range of the frame B (YES in step S118), the corresponding pixel disposed at the set of corresponding coordinates is specified and the processing proceeds to step S120. When it is determined that the calculated set of corresponding coordinates is out of the range of the frame B (NO in step S118), the processing proceeds to step S119.

(Step S119) The motion vector re-calculator 16 sets the motion vector of the target pixel to 0. Then, the processing proceeds to step S120.

(Step S120) The image processor 17 adds the set of coordinates of the target pixel to a motion vector indicated by motion data per pixel input from the motion vector re-calculator 16 for each pixel to calculate a set of corresponding coordinates of the frame B. The image processor 17 performs predetermined image processing, for example, inter-frame NR processing on a signal value of the target pixel indicated by color-separated image data of the frame A and a signal value of the corresponding pixel indicated by color-separated image data of the frame B, which are input from the memory 14. Then, the processing proceeds to step S121.

(Step S121) The controller 12 determines whether the target pixel of the frame A is a final pixel. When it is determined that the target pixel is the final pixel (YES in step S121), the processing illustrated in FIGS. 8 and 9 is ended. When it is determined that the target pixel is not the final pixel (NO in step S121), the controller 12 changes the target pixel that is the processing target to the next pixel based on a predetermined processing order. Then, the processing returns to step S112.

As described above, the image processor 10A of the imaging apparatus 10 according to the present embodiment includes the motion vector calculator 132 which sets a motion vector of a block that is a partial area of the frame A based on the block and a similarity between the block and a partial area of the frame B. In addition, the image processor 10A includes the motion vector reliability calculator 133 which calculates a reliability of a motion vector based on a similarity distribution in the frame B. Furthermore, the image processor 10A includes the motion vector corrector 15 which corrects a motion vector of a low-reliability block based on a motion vector of a high-reliability block which differs from the low-reliability block corresponding to a block having a reliability lower than a predetermined reliability and has a reliability equal to or higher than the predetermined reliability. Moreover, the image processor 10A includes the image processor 17 which sets a corresponding pixel of the frame B which corresponds to a pixel of the frame A based on a motion vector corrected by the motion vector corrector 15 and performs image processing using a signal value of the pixel of the frame A and a signal value of the corresponding pixel of the frame B.

According to this configuration, a motion vector of a region determined to have a low reliability is corrected based on a motion vector with a high reliability among motion vectors calculated for some regions in a frame. Since pixels corresponding to each other between frames can be specified with high reliability, it is possible to suppress deterioration of functions of image processing based on position alignment between frames. In addition, it is possible to obtain motion vectors without performing block matching on all pixels in a frame, and thus increase in the amount of computation and hardware size can be prevented.

Further, in the image processor 10A, the aforementioned high-reliability block is a block disposed within a predetermined range from the low-reliability block that is a processing target.

According to this configuration, a motion vector is corrected based on the high-reliability block adjacent to the low-reliability block that is a processing target, and thus motion of an image represented by the low-reliability block can be compensated for with higher accuracy. Since pixels corresponding to each other between frames can be specified with higher accuracy, deterioration of functions of image processing based on position alignment between frames can be suppressed.

Second Embodiment

Next, a second embodiment of the present invention will be described. Components which are the same as those in the above-described embodiment are referred to by the same signs and description thereof is as cited.

The imaging apparatus 10 according to the present embodiment includes the image processor 10A, the imager 11, the display processor 18 and the display device 19 like the imaging apparatus 10 (FIG. 1) according to the first embodiment. However, the motion vector corrector 15 of the image processor 10A preferentially selects a surrounding block having a short distance from the center of a target block as a surrounding block which provides a motion vector used for calculation of a correction value for the target block that is a processing target determined to be a low-reliability block.

Figure 10:
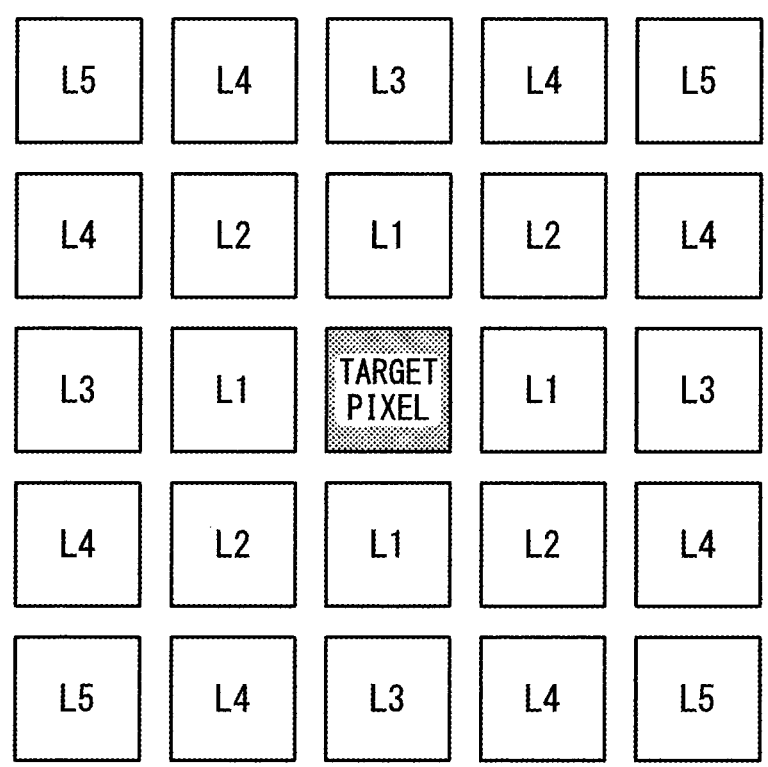
FIG. 10 is a diagram describing processing performed by a motion vector correction unit according to a second embodiment.

Next, processing performed by the motion vector corrector 15 according to the present embodiment will be described using FIG. 10. The motion vector corrector 15 specifies a group L1 including blocks having a shortest distance from a target pixel disposed at the center point of a target block. The motion vector corrector 15 determines whether there are surrounding blocks having a reliability lower than a predetermined reliability threshold value in the specified group. When it is determined that there are surrounding blocks having a lower reliability, the motion vector corrector 15 calculates the average value of motion vectors of the surrounding blocks as a correction value. When it is determined that there is no surrounding block having a lower reliability, the motion vector corrector 15 specifies a group L2 including blocks having a second shortest distance from target pixel. Subsequently, the motion vector corrector 15 sequentially repeats specifying a group including blocks having a next longer distance from the target pixel and determining whether there are surrounding blocks in the specified group until a surrounding pixel is detected or a distance from the target pixel exceeds a predetermined distance threshold value. In the example illustrated in FIG. 10, the distance threshold value is a distance between the target pixel and a block belonging to a group LS.

(Image Processing)

Next, image processing according to the present embodiment will be described.

Figure 11:
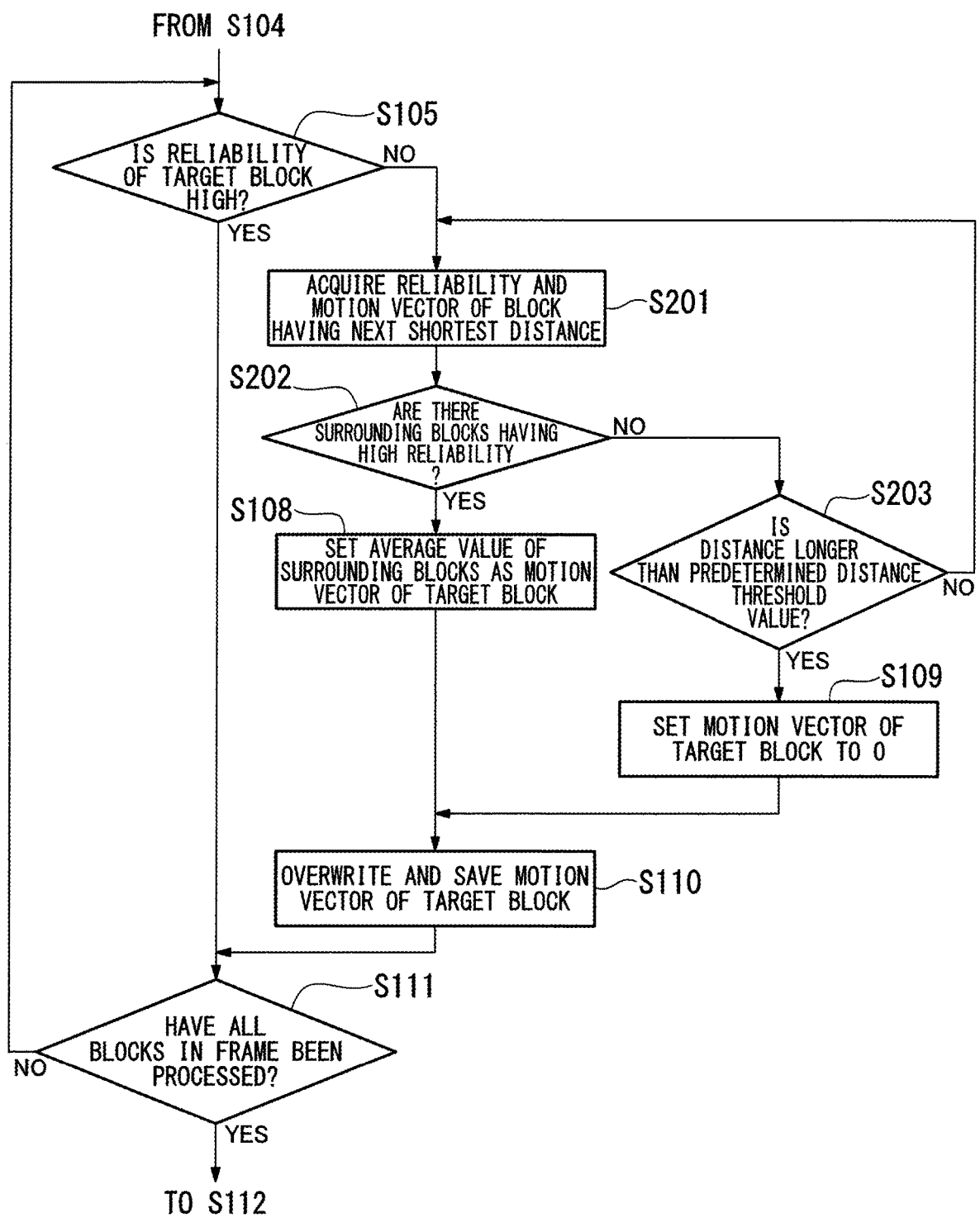
FIG. 11 is a flowchart illustrating image processing according to the second embodiment.

FIG. 11 is a flowchart illustrating image processing according to the present embodiment.

The image processing according to the present embodiment has steps S101 to S105, S108 to S121 and S201 to S203. In FIG. 11, steps S101 to S104 and S112 to S121 are not shown. In step S105, when the motion vector corrector 15 determines that the reliability is lower than the predetermined reliability threshold value for the target block of the frame A (NO in step S105), the processing proceeds to step S201.

(Step S201) The motion vector corrector 15 specifies a block having a next shortest distance from the target pixel and acquires a reliability and a motion vector of the specified block. Here, an initial value of the block specified by the motion vector corrector 15 corresponds to a block having the shortest distance from the target pixel. Thereafter, the processing proceeds to step S202.

(Step S202) The motion vector corrector 15 determines whether there are surrounding blocks having a reliability equal to or higher than a predetermined reliability threshold value in the specific group. When it is determined that there are surrounding blocks (YES in step S202), the processing proceeds to step S108. When it is determined that there is no surrounding block (NO in step S202), the processing proceeds to step S203.

(Step S203) The motion vector corrector 15 determines, for a block having a next shortest distance from the target pixel, whether the distance is longer than a predetermined distance threshold value. When it is determined that the distance is longer than the predetermined distance threshold value (YES in step S203), the processing proceeds to step S109. When it is determined that the distance is not longer than the predetermined distance threshold value (NO in step S203), the processing proceeds to step S201.

As described above, in the image processor 10A of the imaging apparatus 10 according to the present embodiment, in correction of a motion vector of a targeted low-reliability block, the motion vector corrector 15 preferentially uses a motion vector of a block having a short distance from the low-reliability block.

According to this configuration, in correction of a motion vector of a low-reliability block, a motion vector of a high-reliability block adjacent to a low-reliability block that is a processing target is preferentially corrected, and thus motion of an image represented by the low-reliability block can be compensated for with higher accuracy. Since pixels corresponding to each other between frames can be specified with higher accuracy, deterioration of functions of image processing based on position alignment between frames can be suppressed.

Third Embodiment

Next, a third embodiment of the present invention will be described. Components which are the same as those in the above-described embodiments are referred to by the same signs and description thereof is as cited.

Figure 12:
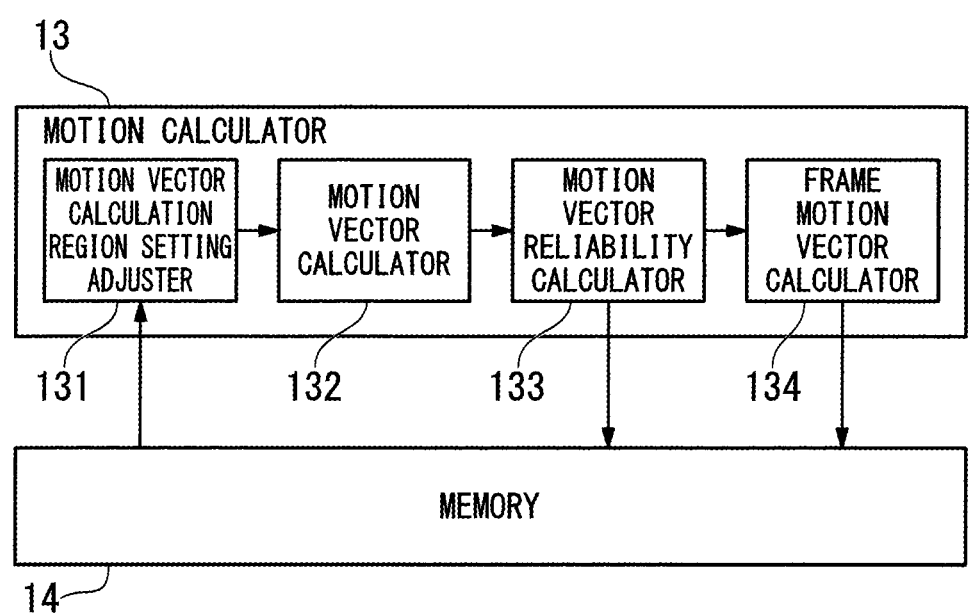
FIG. 12 is a schematic block diagram illustrating a configuration of a motion calculator according to a third embodiment.

The imaging apparatus 10 according to the present embodiment includes the image processor 10A, the imager 11, the display processor 18 and the display device 19 like the imaging apparatus 10 (FIG. 1) according to the first embodiment. However, the motion calculator 13 of the image processor 10A further includes a frame motion vector calculator 134 as illustrated in FIG. 12.

The frame motion vector calculator 134 receives reliability data and motion data from the motion vector reliability calculator 133. The frame motion vector calculator 134 detects high-reliability blocks having a reliability equal to or higher than a predetermined threshold value (e.g., reliability of 0) with reference to the reliability data. The frame motion vector calculator 134 calculates a frame reliability based on a motion vector distribution between the detected high-reliability blocks. The frame motion vector calculator 134 calculates a frame motion vector based on the motion vectors of the high-reliability blocks.

The frame motion vector calculator 134 adds data indicating the calculated frame motion vector to motion data stored in the memory 14 and adds the calculated frame reliability to the reliability data.

For example, the frame motion vector calculator 134 specifies a motion vector of each of the detected high-reliability blocks and counts the number of high-reliability blocks for each specified motion vector when acquiring the motion vector distribution. The numbers of high-reliability blocks counted for each motion vector form a histogram. The frame motion vector calculator 134 determines that a frame reliability is higher when a motion vector distribution between blocks is denser and converges to a specific value and lower when the distribution is wider and dispersed. That is, a frame reliability is an index value indicating a degree to which the motion vector of the frame A can be represented by a specific motion vector.

For example, the frame motion vector calculator 134 specifies a motion vector (most frequent value) corresponding to the largest number of high-reliability blocks among the numbers of high-reliability blocks for respective motion vectors and the number (the largest number N) when calculating the frame reliability. The frame motion vector calculator 134 calculates a difference between 1 and the rate of M to the largest number N (1−N/M) and normalizes the value obtained through the calculation to any one of eight levels of 0 to 7. Here, the frame motion vector calculator 134 determines a level to which the value obtained through the calculation belongs and sets the determined level as a frame reliability. Here, M is the number of blocks included in the frame A. The frame reliability is lower when the set value is larger. Among 0 to 7, 0 indicates the highest frame reliability and 7 indicates the lowest frame reliability. The number of levels is not limited to 8 and may be equal to or greater than 2 and equal to or less than 7 and may be equal to or greater than 9.

The motion vector corrector 15 (FIG. 2) reads reliability data and motion data from the memory 14. When a frame reliability indicated by the read reliability data is equal to or higher than a predetermined frame reliability threshold value (e.g., 0.5 or lower), the motion vector corrector 15 sets a frame motion vector indicated by the motion data as a motion vector of a low-reliability block. In addition, the motion vector corrector 15 sets the motion vector of the low-reliability block to 0 when the frame reliability is lower than the predetermined frame reliability threshold value.

(Image Processing)

Next, image processing according to the present embodiment will be described.

Figure 13:
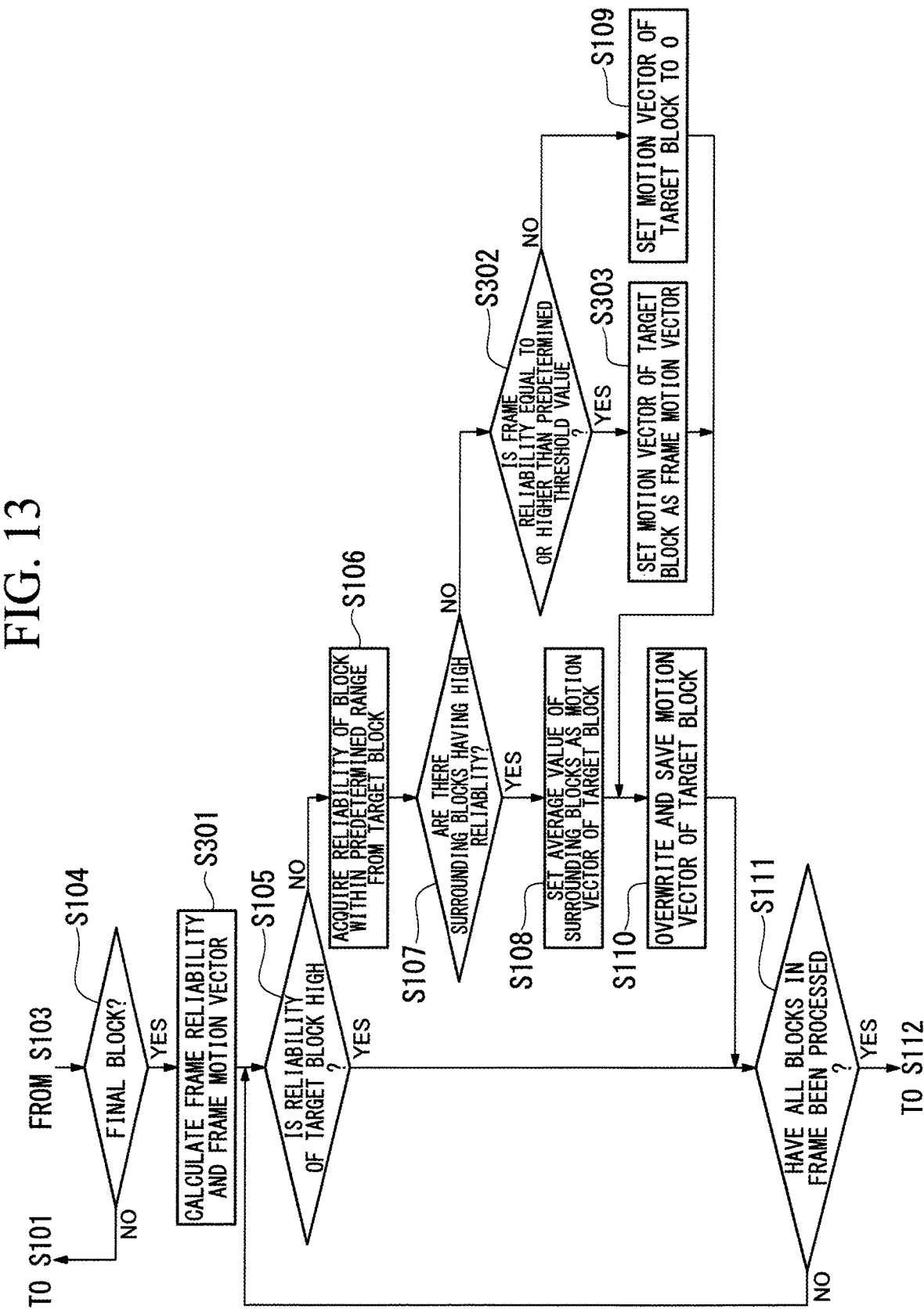
FIG. 13 is a flowchart illustrating image processing according to the third embodiment.

FIG. 13 is a flowchart illustrating the image processing according to the present embodiment.

The image processing according to the present embodiment has steps S101 to S121 and steps S301 to S303. FIG. 13 does not illustrate steps S101 to S103 and steps S112 to S121. In step S104, when the controller 12 determines that the target block of the frame A is the final block (YES in step S104), the processing proceeds to step S301.

(Step S301) The frame motion vector calculator 134 specifies a motion vector of each high-reliability block having a reliability equal to or higher than a predetermined reliability threshold value and counts the number of blocks for each specified motion vector. The frame motion vector calculator 134 calculates a frame reliability based on a most frequent value of motion vectors and sets the most frequent value of motion vectors as a frame motion vector. Then, the processing proceeds to step S105.

In step S107, when the motion vector corrector 15 determines that there is no high-reliability surrounding block having a reliability equal to or higher than the predetermined threshold value in the acquired surrounding blocks (NO in step S107), the processing proceeds to step S302.

(Step S302) The motion vector corrector 15 determines whether the frame reliability is equal to or higher than a predetermined frame reliability threshold value. When it is determined that the frame reliability is equal to or higher than the predetermined frame reliability threshold value (YES in step S302), the processing proceeds to step S303. When it is determined that the frame reliability is lower than the predetermined frame reliability threshold value (NO in step S302), the processing proceeds to step S109.

(Step S303) The motion vector corrector 15 sets the motion vector of the target block (low-reliability block) as a frame motion vector. Then, the processing proceeds to step S110.

As described above, the image processor 10A of the imaging apparatus 10 according to the present embodiment further includes the frame motion vector calculator 134 which calculates a frame motion vector that is a motion vector of the whole of a first image based on motion vectors of high-reliability blocks and calculates a reliability of the frame motion vector based on a distribution of the motion vectors of the high-reliability blocks between blocks. In addition, the motion vector corrector 15 determines whether to correct a motion vector of a low-reliability block using the frame motion vector based on the reliability of the frame motion vector.

According to this configuration, in correction of a motion vector of a low-reliability block, a frame motion vector determined to have a high reliability for the entire frame is used. Accordingly, pixels corresponding to each other between frames can be specified with higher accuracy for low-reliability blocks which have a decreased reliability because they include motions of images of the entire frames, and thus deterioration of functions of image processing based on position alignment between frames can be suppressed. The present embodiment is valid, for example, for regions representing parts of a background distributed in all frames other than a main subject as such low-reliability blocks.

Fourth Embodiment

Next, a fourth embodiment of the present invention will be described. Components which are the same as those in the above-described embodiments are referred to by the same signs and description thereof is as cited.

Figure 14:
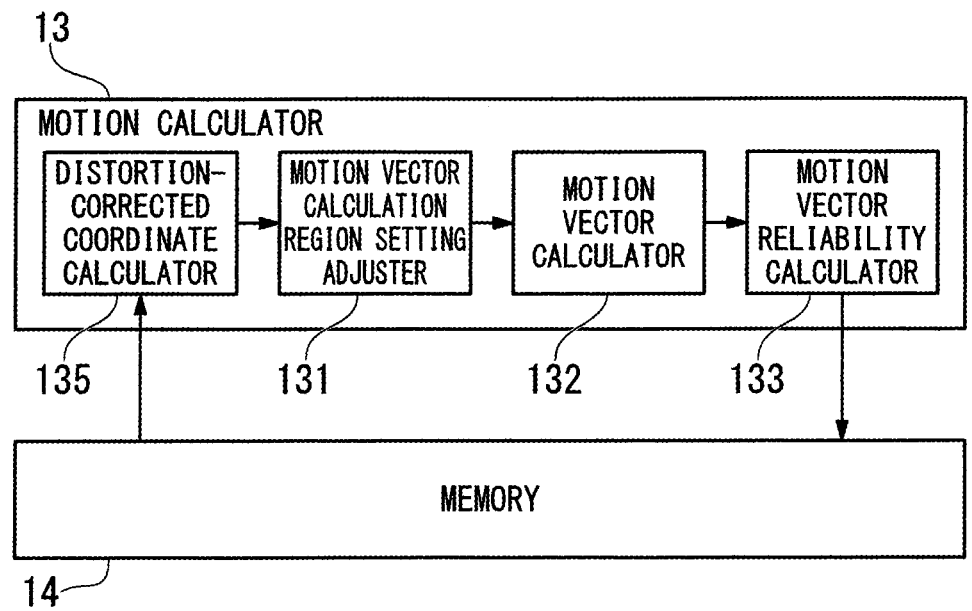
FIG. 14 is a schematic block diagram illustrating a configuration of a motion calculator according to a fourth embodiment.

The imaging apparatus 10 according to the present embodiment includes the image processor 10A, the imager 11, the display processor 18 and the display device 19 like the imaging apparatus 10 (FIG. 1) according to the first embodiment. However, the motion calculator 13 of the image processor 10A further includes a distortion-corrected coordinate calculator 135 as illustrated in FIG. 14.

The distortion-corrected coordinate calculator 135 calculates a set of distortion-corrected coordinates that is a set of coordinates after correction corresponding to each pixel in each block based on predetermined distortion correcting data. The distortion correcting data is data indicating a relationship between a set of coordinates before correction and a set of coordinates after correction in a frame. For example, the distortion correcting data may be data representing an optical distortion coefficient (also called a distortion aberration coefficient) or data representing a set of coordinates of each pixel before correction and a set of coordinates corresponding thereto. The distortion-corrected coordinate calculator 135 generates distortion-corrected coordinate data indicating the calculated set of distortion-corrected coordinates and outputs the generated distortion-corrected coordinate data to the motion vector calculation region setting adjustor 131. The motion vector calculation region setting adjustor 131 acquires a signal value of each set of distortion-corrected coordinates indicated by the distortion-corrected coordinate data input from the distortion-corrected coordinate calculator 135 for each block of the frames A and B.

When the calculated set of distortion-corrected coordinates is a set of coordinates at which any one pixel is disposed, the motion vector calculation region setting adjustor 131 reads data indicating a signal value of the pixel disposed at the set of distortion-corrected coordinates from Y image data stored in the memory 14. When the calculated set of distortion-corrected coordinates is not a set of coordinates at which any one pixel is disposed, a signal value corresponding to the set of distortion-corrected coordinates is calculated by interpolating signal values of pixels disposed within a predetermined range from the set of distortion-corrected coordinates. The motion vector calculation region setting adjustor 131 outputs block data representing a signal value of each set of distortion-corrected coordinates to the motion vector calculator 132. The motion calculator 13 performs the aforementioned processing on a distortion-corrected image to calculate a motion vector and an index value indicating a reliability of the motion vector for each block.

(Example of Distortion Correction)

Figure 15:
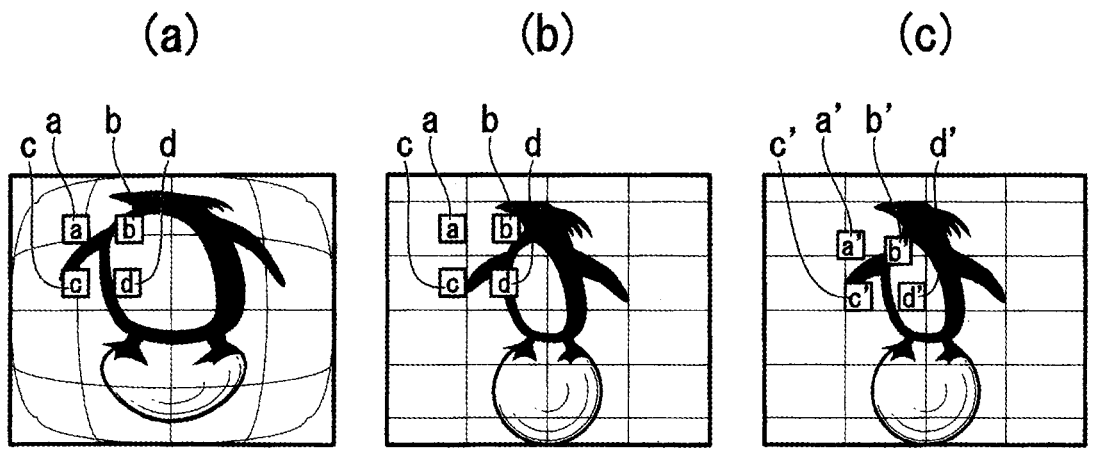
FIG. 15 is a diagram describing distortion correction.

Next, an example of distortion correction according to the present embodiment will be described. FIG. 15 is a diagram describing distortion correction according to the present embodiment. The image shown at the left is an example of a captured image subjected to barrel distortion as optical distortion of a lens constituting an optical system included in the imager 11 of the imaging apparatus 10. The upper, lower, left and right edges of the captured image have contracted and the center portion thereof has expanded due to barrel distortion.

Consequently, division lines that should naturally extend in the horizontal direction or the vertical direction are curved. Four squares indicated on the image represent blocks a to d before correction which are blocks for motion vector calculation.

The image shown at the center is a distortion-corrected image. Contraction and expansion of the image have been eliminated and each division line extends in the horizontal direction or the vertical direction according to distortion correction. This image includes four blocks a to d which are the same regions as those before correction. The image shown at the right is a distortion-corrected image on which four blocks a' to d' are represented in a region corresponding to sets of distortion-corrected coordinates after correction. The blocks a to d distributed to the upper left of the center portion of the image move down to the right lower positions represented by the blocks a' to d' which are estimated as original positions according to distortion correction. Accordingly, distortion of the position and shape of the image caused by the optical system is eliminated and a motion vector which should originally have been calculated is calculated.

(Image Processing)

Figure 16:
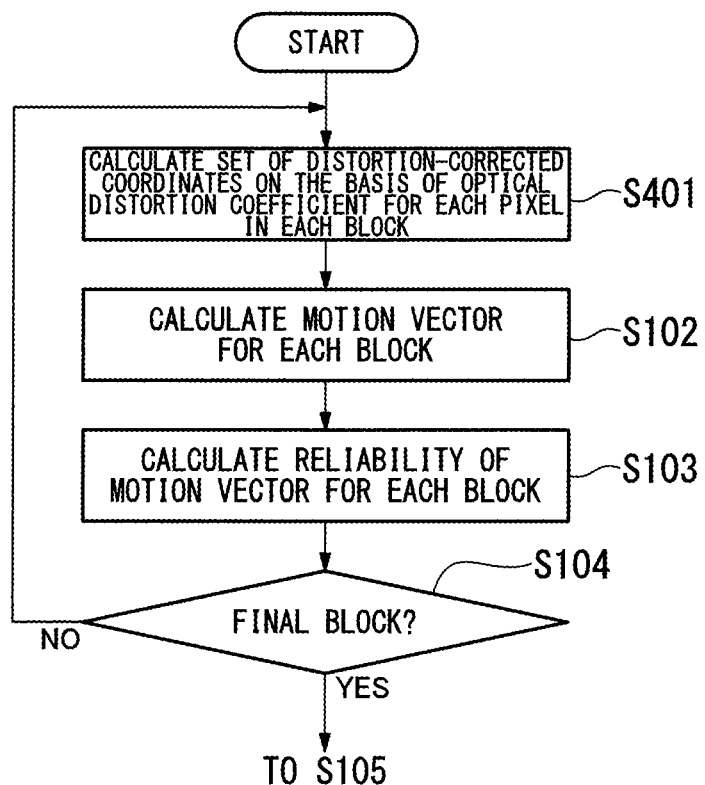
FIG. 16 is a flowchart illustrating image processing according to the fourth embodiment.

Next, image processing according to the present embodiment will be described. FIG. 16 is a flowchart illustrating the image processing according to the present embodiment. The image processing according to the present embodiment has steps S102 to S121 and steps S401. FIG. 16 does not illustrate steps S105 to S121.

(Step S401) The distortion-corrected coordinate calculator 135 calculates a set of distortion-corrected coordinates that is a set of coordinates after correction corresponding to each pixel in each block based on an optical distortion coefficient indicated by distortion correcting data. The motion vector calculation region setting adjustor 131 calculates a set of distortion-corrected coordinates of a pixel in each block of the frames A and B based on distortion-corrected coordinate data input from the distortion-corrected coordinate calculator 135. The motion vector calculation region setting adjustor 131 acquires a signal value of each set of distortion-corrected coordinates indicated by the distortion-corrected coordinate data input from the distortion-corrected coordinate calculator 135 for each block of the frames A and B. Then, the processing proceeds to step S102.

Although a case in which the motion vector calculation region setting adjustor 131 acquires a signal value of a set of distortion-corrected coordinates corresponding to a set of coordinates before distortion correction in each block has been exemplified in the above description, the present invention is not limited thereto. The motion vector calculation region setting adjustor 131 may acquire a signal value of each set of coordinates after distortion correction in each block. In this case, the distortion-corrected coordinate calculator 135 may calculate sets of coordinates of pixels distributed at equal intervals in each block as sets of distortion-corrected coordinates which are sets of coordinates after correction corresponding to sets of coordinates before correction based on the distortion correcting data.

As described above, the image processor 10A of the imaging apparatus 10 according to the present embodiment further includes the distortion-corrected coordinate calculator 135 which corrects a set of coordinates of each pixel representing the frame A based on distortion correcting data representing a relationship between a set of coordinates of each pixel forming a captured image and a set of coordinates after distortion correction.

According to this configuration, a motion vector is calculated after correction of the position and shape of a distorted image, and thus deterioration of reliability and accuracy of a motion vector due to distortion can be eliminated or mitigated. Accordingly, deterioration of functions of image processing based on position alignment between frames can be suppressed.

Fifth Embodiment

Next, a fifth embodiment of the present invention will be described. The same configuration as the above-described embodiments is attached with the same sign and description thereof is cited.

The imaging apparatus 10 according to the present embodiment includes the image processor 11A, the imager 11, the display processor 18 and the display device 19 like the imaging apparatus 10 (FIG. 1) according to the first embodiment. However, the motion calculator 13 of the image processor 10A further includes the frame motion vector calculator 134 (FIG. 12).

In the present embodiment, the frame motion vector calculator 134 detects high-reliability blocks and calculates a frame reliability based on a distribution of motion vectors between detected high-reliability blocks as in the third embodiment. The frame motion vector calculator 134 calculates a frame motion vector based on motion vectors of high-reliability blocks.

In the present embodiment, the motion vector corrector 15 (FIG. 2) sets a frame motion vector indicated by motion data as a common motion vector of each block in the frame A when a frame reliability is equal to or higher than a predetermined frame reliability threshold value. In addition, the motion vector corrector 15 sets the common motion vector of each block in the frame A to 0 when a frame reliability is lower than the predetermined frame reliability threshold value. The motion vector corrector 15 updates the motion vector of each block indicated by motion data to the set motion vector and stores motion data indicating the updated motion vector in the memory 14.

(Image Processing)

Next, image processing according to the present embodiment will be described.

Figure 17:
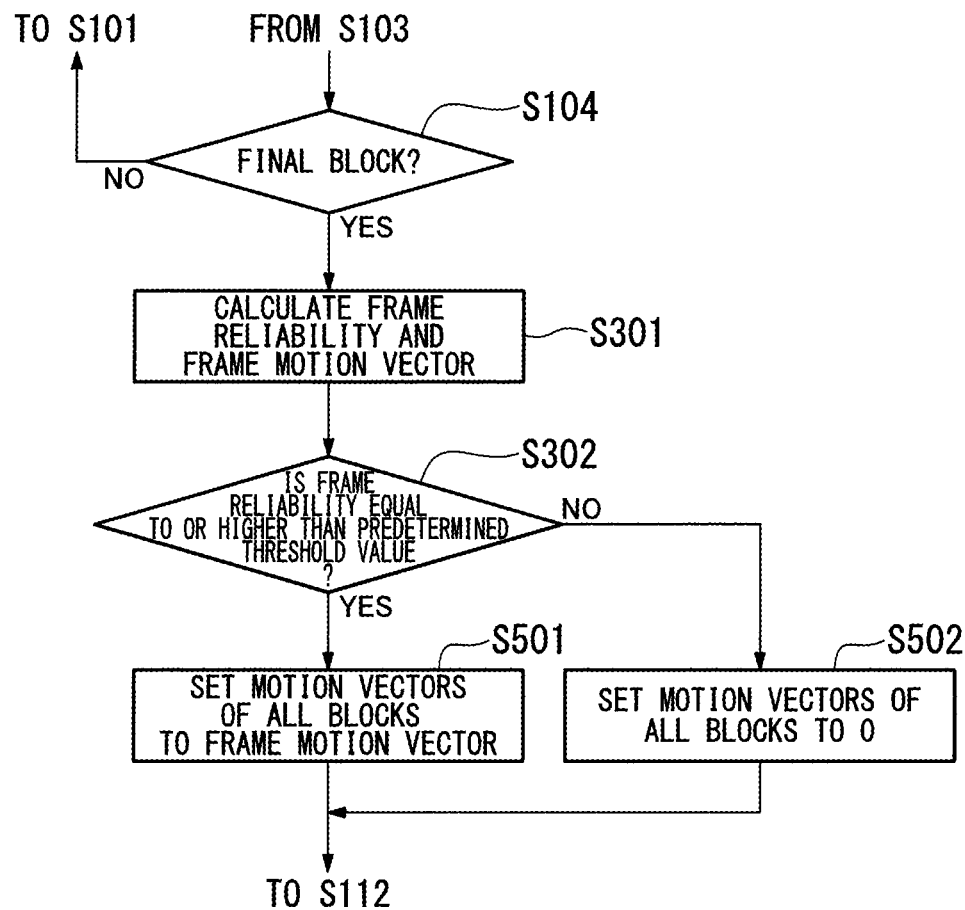
FIG. 17 is a flowchart illustrating image processing according to a fifth embodiment
Figure 18:
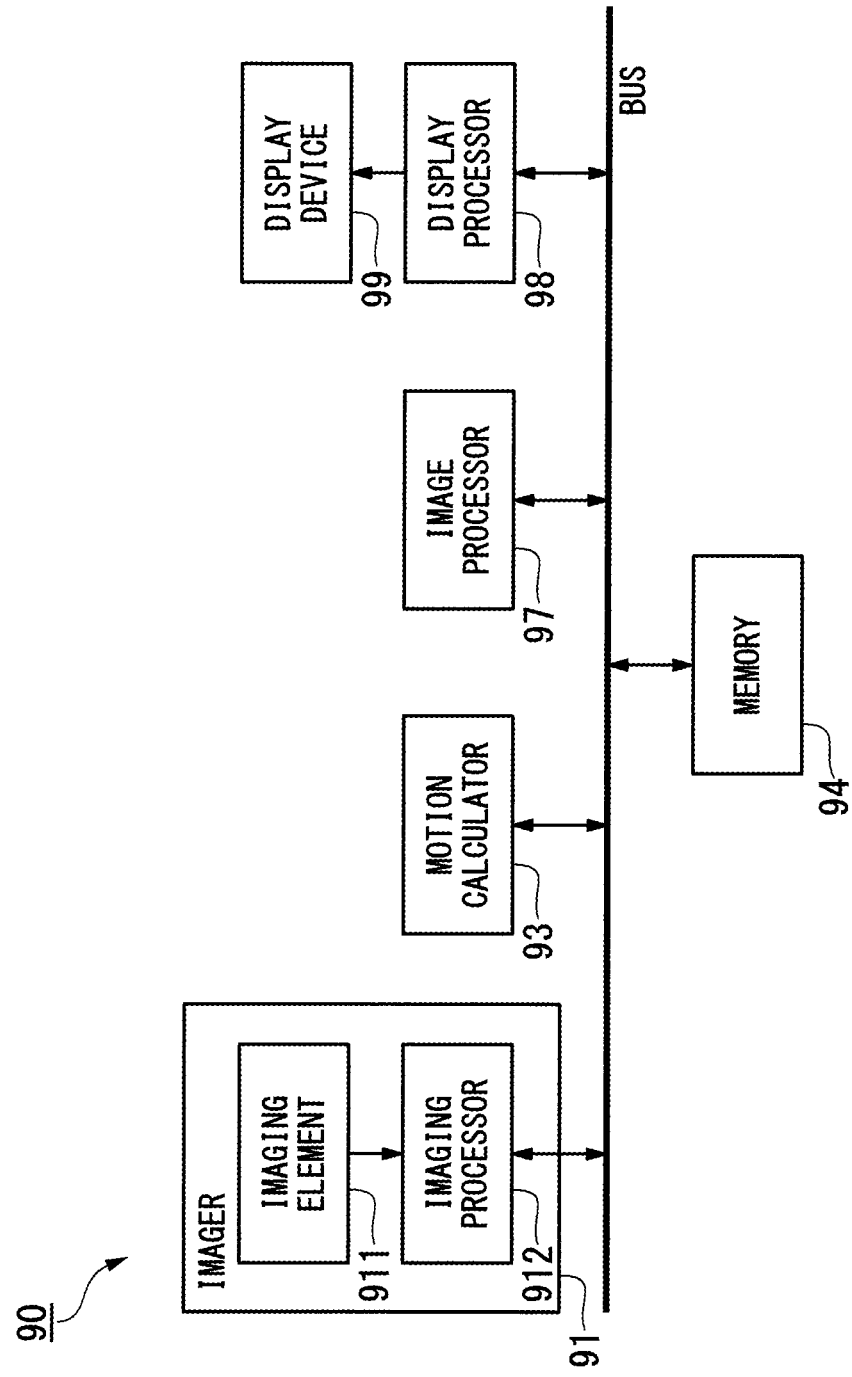
FIG. 18 is a schematic block diagram illustrating a configuration of a conventional imaging apparatus.

FIG. 17 is a flowchart illustrating the image processing according to the present embodiment.

The image processing according to the present embodiment has steps S101 to S104, S112 to S121, S301, S302, S501 and S502. FIG. 16 does not illustrate steps S101 to S103 and steps S112 to S121. In step S104, when the controller 12 determines that the target block of the frame A is the final block (YES in step S104), the processing proceeds to step S301.

(Step S301) The frame motion vector calculator 134 specifies a motion vector of each high-reliability block having a reliability equal to or higher than a predetermined reliability threshold value and calculates a frame reliability based on a most frequent value of specified motion vectors. In addition, the frame motion vector calculator 134 sets the most frequent value of the motion vectors as a frame motion vector. Then, the processing proceeds to step S302.

(Step S302) The motion vector corrector 15 determines whether the frame reliability is equal to or higher than a predetermined frame reliability threshold value. When it is determined that the frame reliability is equal to or higher than the predetermined frame reliability threshold value (YES in step S302), the processing proceeds to step S501. When it is determined that the frame reliability is lower than the predetermined frame reliability threshold value (NO in step S302), the processing proceeds to step S502.

(Step S501) The motion vector corrector 15 sets the frame motion vector as a motion vector of all blocks in the frame A. Then, the processing proceeds to step S112.

(Step S502) The motion vector corrector 15 sets the motion vector of all blocks in the frame A to a predetermined vector (e.g., 0). Then, the processing proceeds to step S112.

The motion vector corrector 15 (FIG. 2) may add data indicating a motion vector commonly set for each block in the frame A to the motion data stored in the memory 14. In the present embodiment, the motion vector re-calculator 16 (FIG. 2) may be omitted. The image processor 17 may read motion data from the memory 14 and add a common motion vector for each block, which is indicated by the read motion data, to a set of coordinates of each pixel in the frame A to calculate a set of corresponding coordinates in the frame B.

As described above, the image processor 10A of the imaging apparatus 10 according to the present embodiment includes the motion vector calculator 132 which sets a motion vector of a block that is a partial area of the frame A based on the block and a similarity between the block and a partial area of the frame B.

In addition, the image processor 10A includes the motion vector reliability calculator 133 which calculates a reliability of a motion vector based on a similarity distribution in the frame B. Furthermore, the image processor 10A includes the frame motion vector calculator 134 which calculates a frame motion vector that is a motion vector of the entire frame A based on motion vectors of high-reliability blocks which are different from a low-reliability block having a reliability lower than a predetermined reliability and have a reliability equal to or higher than the predetermined reliability and calculates a reliability of the frame motion vector based on a distribution of the motion vectors of the high-reliability blocks. Moreover, the image processor 10A includes the motion vector corrector 15 which determines whether to correct motion vectors of all blocks of the frame A using the frame motion vector based on the reliability of the frame motion vector. Further, the image processor 10A includes the image processor 17 which sets a corresponding pixel of the frame B corresponding to a pixel of the frame A based on motion vectors corrected by the motion vector corrector 15 and performs image processing using a signal value of the pixel of the frame A and a signal value of the corresponding pixel of the frame B.

According to this configuration, when it is determined that a reliability of a frame motion vector representative of motion vectors of an entire frame is high, pixels corresponding to each other between frames can be specified in the entire frame using the frame motion vector. Accordingly, it is possible to reduce power consumption by decreasing the frequency of access to a memory for image data using different motion vectors between blocks or between pixels. In addition, it is possible to achieve both decrease in power consumption and suppression of deterioration of functions of image processing based on position alignment between frames.

Although embodiments of the present invention have been described above with reference to the drawings, specific configurations are not limited to the above-described embodiments.

For example, the display device 19 may be embedded in the imaging apparatus as described above or may be detachably attached to the imaging apparatus 10. In addition, the imaging apparatus 10 may include a data input/output interface that is connectable to various display devices instead of the display device 19.

Although position alignment between the two temporally adjacent frames A and B has been exemplified in the above description, the present invention is not limited thereto. The two frames A and B may be individual frames temporally separated from each other. In addition, the image processor 17 may perform position alignment between three or more frames by repeating position alignment between two frames for image data representing a moving image composed of a plurality of frames and perform predetermined image processing between such frames.

The image processor 10A may be embedded in the imaging apparatus 10 as described above or may be configured as an image processing device independent of the imaging apparatus 10. In addition, the image processor 10A may be embedded as a part of electronic equipment which does not have imaging as a main function, for example, a cellular phone (including a so-called smartphone), a receiving apparatus (including a television receiving apparatus), a transmission apparatus and the like.

Further, parts of the aforementioned imaging apparatus 10, for example, the image processor 10A and the controller 12 may be realized as a computer. In this case, a program for realizing the control function may be recorded on a computer-readable recording medium and a computer system may be caused to read and execute the program recorded on the recording medium. Here, "computer system" is a computer system embedded in the imaging apparatus 10 or an image processing device and includes OS and hardware such as peripheral equipment. Further, "computer-readable recording medium" refers to a portable medium such as a flexible disk, a magneto-optic disk, ROM or CD-ROM and a storage apparatus such as a hard disk embedded in a computer system. Further, "computer-readable recording medium" may include a medium which dynamically retains a program for a short time, such as a communication line when a program is transmitted via a network such as the Internet or a communication channel such as a telephone line, and a medium which retains a program for a specific time in such a case, such as a volatile memory in a computer system composed of a server and a client. In addition, the aforementioned program may realize part of the above-described functions and may further realize the above-described functions according to a combination with a program which has already been recorded on the computer system.

Further, all or part of the imaging apparatus 10 and the image processing device in the above-described embodiments may be realized as an integrated circuit such as large scale integration (LSI). Each functional block of the imaging apparatus 10 and the image processing device may be individually configured as a processor, or all or part thereof may be integrated and configured as a processor. Further, a technique for realizing the integrated circuit is not limited to an LSI and the integrated circuit may be realized as a dedicated circuit or a general-purpose processor. Further, when a technology for realizing integration circuits which replace LSI emerges with the development of semiconductor technology, integrated circuits according to the technology may be used.

Although preferred embodiments of the present invention have been described above, the present invention is not limited to such embodiments and modified examples thereof. Additions, omissions, substitutions, and other modifications of components can be made without departing from the spirit or scope of the present invention.

Furthermore, the present invention is not to be considered as being limited by the foregoing description, and is only limited by the scope of the appended claims

What is claimed is:

1. An image processing device comprising:
a motion vector calculator which sets a motion vector of a block corresponding to a partial area of a first image based on the block and a similarity between the block and a partial area of a second image;
a motion vector reliability calculator which calculates a reliability of the motion vector based on a distribution of the similarities;
a frame motion vector calculator which calculates a frame motion vector which is a motion vector of the entire first image based on a motion vector of a high-reliability block having a reliability equal to or higher than a predetermined reliability, and a reliability of the frame motion vector based on a distribution of the motion vectors of the high-reliability blocks;
a motion vector corrector which determines whether to correct a motion vector of a low-reliability block having a reliability lower than the predetermined reliability using the frame motion vector based on the reliability of the frame motion vector and corrects the motion vector of the low-reliability block based on the frame motion vector when determining that the motion vector of the low-reliability block is to be corrected;
an image processor which sets a second pixel that is a pixel of the second image and corresponds to a first pixel which is a pixel of the first image based on the motion vector corrected by the motion vector corrector, and performs image processing using a signal value of the first pixel and a signal value of the second pixel; and
a distortion-corrected coordinate calculator which corrects a set of coordinates of each pixel representing the first image based on distortion correcting data representing a relationship between a set of coordinates of each pixel forming a captured image and a set of coordinates after distortion correction.

2. An image processing device comprising:
a motion vector calculator which sets a motion vector of a block corresponding to a partial area of a first image based on the block and a similarity between the block and a partial area of a second image;
a motion vector reliability calculator which calculates a reliability of the motion vector based on a distribution of the similarities;
a frame motion vector calculator which calculates a frame motion vector which is a motion vector of the entire first image based on a motion vector of a high-reliability block different from a low-reliability block having a reliability lower than a predetermined reliability and having a reliability equal to or higher than the predetermined reliability, and a reliability of the frame motion vector based on a distribution of the motion vectors of the high-reliability blocks;
a motion vector corrector which determines whether to correct motion vectors of all blocks of the first image using the frame motion vector based on the reliability of the frame motion vector; and
an image processor which sets a second pixel that is a pixel of the second image and corresponds to a first pixel which is a pixel of the first image based on the motion vector corrected by the motion vector corrector, and performs image processing using a signal value of the first pixel and a signal value of the second pixel; and
a distortion-corrected coordinate calculator which corrects a set of coordinates of each pixel representing the first image based on distortion correcting data representing a relationship between a set of coordinates of each pixel forming a captured image and a set of coordinates after distortion correction.

3. An image processing method of an image processing device, comprising:
a motion vector calculation step of setting a motion vector of a block corresponding to a partial area of a first image based on the block and a similarity between the block and a partial area of a second image;
a motion vector reliability calculation step of calculating a reliability of the motion vector based on a distribution of the similarities;

a frame motion vector calculation step of calculating a frame motion vector which is a motion vector of the entire first image based on a motion vector of a high-reliability block having a reliability equal to or higher than a predetermined reliability, and a reliability of the frame motion vector based on a distribution of the motion vectors of the high-reliability blocks;

a motion vector correction step of determining whether to correct a motion vector of a low-reliability block having a reliability lower than the predetermined reliability using the frame motion vector based on the reliability of the frame motion vector and correcting the motion vector of the low-reliability block based on the frame motion vector when determining the motion vector of the low-reliability block to be corrected;

an image processing step of setting a second pixel that is a pixel of the second image and corresponds to a first pixel which is a pixel of the first image based on the motion vector corrected by the motion vector corrector, and performing image processing using a signal value of the first pixel and a signal value of the second pixel; and a distortion-corrected coordinate calculation step of correcting a set of coordinates of each pixel representing the first image based on distortion correcting data representing a relationship between a set of coordinates of each pixel forming a captured image and a set of coordinates after distortion correction.

4. An image processing method of an image processing device, comprising:

a motion vector calculation step of setting a motion vector of a block corresponding to a partial area of a first image based on the block and a similarity between the block and a partial area of a second image;

a motion vector reliability calculation step of calculating a reliability of the motion vector based on a distribution of the similarities;

a frame motion vector calculation step of calculating a frame motion vector which is a motion vector of the entire first image based on a motion vector of a high-reliability block different from a low-reliability block having a reliability lower than a predetermined reliability and having a reliability equal to or higher than the predetermined reliability, and a reliability of the frame motion vector based on a distribution of the motion vectors of the high-reliability blocks;

a motion vector correction step of determining whether to correct motion vectors of all blocks of the first image using the frame motion vector based on the reliability of the frame motion vector;

an image processing step of setting a second pixel that is a pixel of the second image and corresponds to a first pixel which is a pixel of the first image based on the motion vector corrected by the motion vector corrector, and performing image processing using a signal value of the first pixel and a signal value of the second pixel; and a distortion-corrected coordinate calculation step of correcting a set of coordinates of each pixel representing the first image based on distortion correcting data representing a relationship between a set of coordinates of each pixel forming a captured image and a set of coordinates after distortion correction.

5. A non-transitory computer program product comprising computer readable instructions, which when loaded and run in a computer processor, causes the computer processor of an image processing device to execute:

a motion vector calculation procedure for setting a motion vector of a block corresponding to a partial area of a first image based on the block and a similarity between the block and a partial area of a second image;

a motion vector reliability calculation procedure for calculating a reliability of the motion vector based on a distribution of the similarities;

a frame motion vector calculation procedure for calculating a frame motion vector which is a motion vector of the entire first image based on a motion vector of a high-reliability block having a reliability equal to or higher than a predetermined reliability, and a reliability of the frame motion vector based on a distribution of the motion vectors of the high-reliability blocks;

a motion vector correction procedure for determining whether to correct a motion vector of a low-reliability block having a reliability lower than the predetermined reliability using the frame motion vector based on the reliability of the frame motion vector and correcting the motion vector of the low-reliability block based on the frame motion vector when determining the motion vector of the low-reliability block to be corrected;

an image processing procedure for setting a second pixel that is a pixel of the second image and corresponds to a first pixel which is a pixel of the first image based on the motion vector corrected by the motion vector correction procedure, and performing image processing using a signal value of the first pixel and a signal value of the second pixel; and a distortion-corrected coordinate calculation procedure for correcting a set of coordinates of each pixel representing the first image based on distortion correcting data representing a relationship between a set of coordinates of each pixel forming a captured image and a set of coordinates after distortion correction.

6. A non-transitory computer program product comprising computer readable instructions, which when loaded and run in a computer processor, causes the computer processor of an image processing device to execute:

a motion vector calculation procedure for setting a motion vector of a block corresponding to a partial area of a first image based on the block and a similarity between the block and a partial area of a second image;

a motion vector reliability calculation procedure for calculating a reliability of the motion vector based on a distribution of the similarities;

a frame motion vector calculation procedure for calculating a frame motion vector which is a motion vector of the entire first image based on a motion vector of a high-reliability block different from a low-reliability block having a reliability lower than a predetermined reliability and having a reliability equal to or higher than the predetermined reliability, and a reliability of the frame motion vector based on a distribution of the motion vectors of the high-reliability blocks;

a motion vector correction procedure for determining whether to correct motion vectors of all blocks of the first image using the frame motion vector based on the reliability of the frame motion vector;

an image processing procedure for setting a second pixel that is a pixel of the second image and corresponds to a first pixel which is a pixel of the first image based on the motion vector corrected by the motion vector correction procedure, and performing image processing using a signal value of the first pixel and a signal value of the second pixel; and a distortion-corrected coordinate calculation procedure for correcting a set of coordinates of each pixel representing the first image based on distortion correcting data representing a relationship between a set of coordinates of each pixel forming a captured image and a set of coordinates after distortion correction.

* * * * *